(12) United States Patent
Nelms et al.

(10) Patent No.: US 11,853,988 B2
(45) Date of Patent: Dec. 26, 2023

(54) METHOD FOR SELF-CHECKOUT WITH A MOBILE DEVICE

(71) Applicant: Walmart Apollo, LLC, Bentonville, AR (US)

(72) Inventors: David Martin Nelms, Rogers, AR (US); Jason Todd, Lowell, AR (US); Tim Webb, Rogers, AR (US); Philip Wayne Marbut, Bentonville, AR (US); Douglas Jahe Ryner, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 368 days.

(21) Appl. No.: 17/004,819

(22) Filed: Aug. 27, 2020

(65) Prior Publication Data

US 2021/0081914 A1 Mar. 18, 2021

Related U.S. Application Data

(60) Continuation of application No. 16/730,567, filed on Dec. 30, 2019, now Pat. No. 10,803,435, which is a
(Continued)

(51) Int. Cl.
*G06Q 20/00* (2012.01)
*G06Q 20/20* (2012.01)
*G06Q 30/0601* (2023.01)

(52) U.S. Cl.
CPC ......... *G06Q 20/20* (2013.01); *G06Q 30/0633* (2013.01); *G06Q 30/0641* (2013.01)

(58) Field of Classification Search
CPC . G06Q 20/20; G06Q 30/0633; G06Q 30/0641
See application file for complete search history.

(56) References Cited

U.S. PATENT DOCUMENTS 5,055,660 A 10/1991 Bertagna
5,457,307 A 10/1995 Dumont
(Continued)

FOREIGN PATENT DOCUMENTS

CA 2809523 4/2012
CN 108805546 A 11/2018
(Continued)

OTHER PUBLICATIONS

Chinese Office Action from related Chinese patent application No. 201180045758.1 dated Dec. 29, 2017.
(Continued)

*Primary Examiner* — Rokib Masud
(74) *Attorney, Agent, or Firm* — Fitch, Even, Tabin & Flannery LLP

(57) ABSTRACT

A method for purchasing an item using a mobile device is provided. The method includes but is not limited to inputting identification information into the mobile device which identifies the item for purchase and generating an order for the item identified by the identification information. The method also includes but is not limited to displaying on a display of the mobile device an optical machine-readable representation of the order.

23 Claims, 24 Drawing Sheets

Related U.S. Application Data continuation of application No. 15/956,400, filed on Apr. 18, 2018, now abandoned, which is a division of application No. 12/947,545, filed on Nov. 16, 2010, now Pat. No. 10,121,133.

(60) Provisional application No. 61/392,908, filed on Oct. 13, 2010.

(56) References Cited

U.S. PATENT DOCUMENTS

| | | |
|---|---|---|
| 5,489,773 A | 2/1996 | Kumar |
| 5,689,101 A | 11/1997 | Kikuchi |
| 5,736,721 A | 4/1998 | Swartz |
| 5,804,807 A | 9/1998 | Murrah |
| 5,825,002 A | 10/1998 | Roslak |
| 5,918,211 A | 6/1999 | Sloane |
| 5,923,735 A | 7/1999 | Swartz |
| 5,978,772 A | 11/1999 | Mold |
| 5,979,753 A | 11/1999 | Roslak |
| 5,979,757 A | 11/1999 | Tracy |
| 6,018,397 A | 1/2000 | Cloutier |
| 6,131,814 A | 10/2000 | Swartz |
| 6,179,206 B1 | 1/2001 | Matsumori |
| 6,354,496 B1 | 3/2002 | Murphy |
| 6,367,694 B1 | 4/2002 | Roslak |
| 6,382,357 B1 | 5/2002 | Morrison |
| 6,507,279 B2 | 1/2003 | Loof |
| 6,550,672 B1 | 4/2003 | Tracy |
| 6,571,218 B1 | 5/2003 | Sadler |
| 6,598,791 B2 | 7/2003 | Bellis, Jr. |
| 6,601,759 B2 | 8/2003 | Fife |
| 6,606,411 B1 | 8/2003 | Loui |
| 6,685,093 B2 | 2/2004 | Challa |
| 6,745,186 B1 | 6/2004 | Testa |
| 6,804,528 B1 | 10/2004 | Laroia |
| 6,810,149 B1 | 10/2004 | Squilla |
| 6,820,062 B1 | 11/2004 | Gupta |
| 6,837,436 B2 | 1/2005 | Swartz |
| 6,854,651 B2 | 2/2005 | Smith |
| 6,886,101 B2 | 4/2005 | Glazer |
| 6,926,202 B2 | 8/2005 | Noonan |
| 6,937,989 B2 | 8/2005 | McIntyre |
| 7,047,041 B2 | 5/2006 | Vaenskae |
| 7,114,656 B1 | 10/2006 | Garver |
| 7,124,940 B2 | 10/2006 | Som |
| 7,177,820 B2 | 2/2007 | McIntyre |
| 7,194,430 B2 | 3/2007 | Vonholm |
| 7,207,477 B1 | 4/2007 | Ramachandran |
| 7,209,903 B1 | 4/2007 | Mamdani |
| 7,222,363 B2 | 5/2007 | Rice |
| 7,376,583 B1 | 5/2008 | Rolf |
| 7,431,208 B2 | 10/2008 | Feldman |
| 7,493,284 B2 | 2/2009 | Celi, Jr. |
| 7,587,756 B2 | 9/2009 | Peart |
| 7,635,084 B2 | 12/2009 | Wang |
| 7,716,064 B2 | 5/2010 | McIntyre |
| 7,725,326 B1 | 5/2010 | Tracy |
| 7,997,486 B2 | 8/2011 | Ulrich |
| 8,069,092 B2 | 11/2011 | Bryant |
| 8,091,780 B2 | 1/2012 | Todd |
| 8,572,712 B2 | 10/2013 | Rice |
| 8,645,221 B1 | 2/2014 | Sarma |
| 8,720,771 B2 | 5/2014 | Mackinnon Keith |
| 8,751,316 B1 * | 6/2014 | Fletchall ............. G07G 1/0081 705/16 |
| 8,814,039 B2 | 8/2014 | Bishop |
| 8,820,633 B2 | 9/2014 | Bishop |
| 8,851,369 B2 | 10/2014 | Biship |
| 9,195,981 B2 | 11/2015 | Annan |
| 10,121,133 B2 | 11/2018 | Nelms |
| 10,496,951 B1 | 12/2019 | Kandukuri |
| 10,803,435 B2 | 10/2020 | Nelms |
| 10,872,326 B2 | 12/2020 | Garner |
| 10,915,906 B2 | 2/2021 | Keith |
| 10,990,960 B2 | 4/2021 | Koeppel |
| 11,263,682 B2 | 3/2022 | Karmakar |
| 2002/0060246 A1 | 5/2002 | Gobburu |
| 2002/0096564 A1 | 7/2002 | Donald |
| 2002/0145038 A1 | 10/2002 | O'Hagan |
| 2002/0178088 A1 | 11/2002 | Lurie |
| 2003/0015585 A1 | 1/2003 | Wike |
| 2003/0057284 A1 | 3/2003 | Challa |
| 2003/0132298 A1 | 7/2003 | Swartz |
| 2003/0149630 A1 | 8/2003 | Jacobs |
| 2003/0149663 A1 | 8/2003 | Vonholm |
| 2003/0158796 A1 | 8/2003 | Balent |
| 2003/0195818 A1 | 10/2003 | Howell |
| 2004/0056101 A1 | 3/2004 | Barkan |
| 2004/0103034 A1 | 5/2004 | Reade |
| 2004/0171378 A1 | 9/2004 | Rautila |
| 2004/0193499 A1 | 9/2004 | Ortiz |
| 2005/0017071 A1 | 1/2005 | Noonan |
| 2005/0246714 A1 | 11/2005 | Moore |
| 2006/0043175 A1 | 3/2006 | Fu |
| 2006/0108419 A1 | 5/2006 | Som |
| 2006/0124733 A1 | 6/2006 | Matthews |
| 2006/0293968 A1 | 12/2006 | Brice |
| 2007/0051801 A1 | 3/2007 | Garver |
| 2007/0069016 A1 | 3/2007 | Garver |
| 2007/0080219 A1 | 4/2007 | Garver |
| 2007/0080220 A1 | 4/2007 | Garver |
| 2007/0241189 A1 | 10/2007 | Slavin |
| 2007/0255620 A1 | 11/2007 | Tumminaro |
| 2008/0011825 A1 | 1/2008 | Giordano |
| 2008/0133366 A1 | 6/2008 | Evans |
| 2008/0228591 A1 | 9/2008 | Watanabe |
| 2008/0237340 A1 | 10/2008 | Emmons |
| 2008/0296392 A1 | 12/2008 | Connell, II |
| 2009/0043658 A1 | 2/2009 | Webb |
| 2009/0055278 A1 | 2/2009 | Nemani |
| 2009/0088203 A1 | 4/2009 | Havens |
| 2009/0094100 A1 * | 4/2009 | Xavier ................. G06Q 20/204 705/16 |
| 2009/0099961 A1 | 4/2009 | Ogilvy |
| 2009/0101713 A1 | 4/2009 | Ulrich |
| 2009/0192892 A1 | 7/2009 | Cason |
| 2009/0250515 A1 | 10/2009 | Todd |
| 2009/0261164 A1 | 10/2009 | Sato |
| 2010/0063891 A1 * | 3/2010 | Townsend .......... G06Q 30/0222 705/26.1 |
| 2010/0082444 A1 | 4/2010 | Lin |
| 2010/0082445 A1 | 4/2010 | Hodge |
| 2010/0082447 A1 | 4/2010 | Lin |
| 2010/0125510 A1 * | 5/2010 | Smith .................. G06Q 20/425 705/17 |
| 2010/0138344 A1 | 6/2010 | Wong |
| 2010/0259549 A1 | 10/2010 | Brown |
| 2010/0287057 A1 | 11/2010 | Aihara |
| 2011/0075213 A1 | 3/2011 | Murayama |
| 2011/0225057 A1 | 9/2011 | Webb |
| 2011/0251892 A1 | 10/2011 | Laracey |
| 2011/0289113 A1 | 11/2011 | Arling |
| 2012/0041845 A1 † | 2/2012 | Rothschild |
| 2012/0054046 A1 | 3/2012 | Albisu |
| 2012/0095853 A1 | 4/2012 | Von Bose |
| 2012/0173351 A1 | 7/2012 | Hanson |
| 2012/0267432 A1 | 10/2012 | Kuttuva |
| 2013/0290234 A1 | 10/2013 | Harris |
| 2015/0106213 A1 | 4/2015 | Guen |
| 2018/0240088 A1 | 8/2018 | Nelms |
| 2020/0134588 A1 | 4/2020 | Nelms |
| 2021/0081914 A1 | 3/2021 | Nelms |

FOREIGN PATENT DOCUMENTS

| | | |
|---|---|---|
| EP | 1120071 | 8/2001 |
| GB | 2497842 | 6/2013 |
| JP | 2001325468 | 11/2001 |
| JP | 2002189785 | 7/2002 |
| JP | 2002197384 | 7/2002 |
| JP | 2003140865 | 5/2003 |
| JP | 2003323570 | 11/2003 |
| JP | 2004021607 | 1/2004 |

(56) References Cited

FOREIGN PATENT DOCUMENTS

| JP | 2006146774 | 6/2006 |
|---|---|---|
| JP | 2010092146 | 4/2010 |
| JP | 2010182105 | 8/2010 |
| JP | 2013541107 | 11/2013 |
| JP | 2016219034 | 12/2016 |
| JP | 6419926 | 11/2018 |
| JP | 6615972 | 12/2019 |
| KR | 1020070087811 | 8/2007 |
| WO | 2003060646 | 7/2003 |
| WO | 2003090023 | 10/2003 |
| WO | 2009116954 | 9/2009 |
| WO | 2012051316 | 4/2012 |

OTHER PUBLICATIONS

Emigh, Jacqueline et al; "Windows May be coming to Your Shopping Cart This Year" Betanews; Published Jan. 14, 2008; Accessed Aug. 12, 2010; http://www.betanews.comfWindows-may-be-coming-to-your-shopping-cart-this-year/1200339171.
Examination Report from related Great Britain patent application No. GB1221399.7 dated Jan. 10, 2018.
Examination Search Report from related Canadian patent application No. 2,809,523 dated Feb. 19, 2018.
Hhappe, Inc. Shop 'n Stock; "Grocery Shopping—A Whole New Way!" 2009-2010, Accessed Aug. 12, 2010; http://www.shop-n-stock.com.
IBM; IP.com No. IPCOM000139258D "System and Method for Retail Store Self Checkout via Cellular Phone Technology" Published Aug. 17, 2006; www.ip.com.
International Search Report and Written Opinion from related international patent application No. PCT/US2011/055984 (filed Oct. 21, 2011).
Office Action from related Brazilian Patent Application No. BR112013008325-5 dated Sep. 18, 2019.
Office Action from related Chinese patent application No. 201180045758.1 dated Jun. 13, 2016.
Office Action from related Great Britain patent application No. 1221399.7 dated Mar. 20, 2018.
Office Action from related Japanese patent application No. 2013-533976 dated Mar. 29, 2016.
Office Action dated Aug. 4, 2015 in related Japanese patent application No. 2013-533976.
Schematic "Stop & Shop: Scan It !—Elevating Interactivity" Published Jan. 27, 2010; Accessed Aug. 12, 2010 http://touch.schematic.com/2010/01/stop-shop-scan-it/.
SN Staff; Supermarket News Kroger Store Deploys Tunnel Scanners' at Checkout; Published Jul. 21, 2010; Accessed Nov. 17, 2010 http://supermarketnews.com/news/tunnel_scanner_0721/.
U.S. Appl. No. 12/947,545; Notice of Allowance dated Jun. 25, 2018.
U.S. Appl. No. 12/947,545; Office Action dated Jan. 13, 2017.
U.S. Appl. No. 12/947,545; Office Action dated Jan. 15, 2016.
U.S. Appl. No. 12/947,545; Office Action dated Mar. 9, 2012.
U.S. Appl. No. 12/947,545; Office Action dated Mar. 26, 2015.
U.S. Appl. No. 12/947,545; Office Action dated Jun. 30, 2014.
U.S. Appl. No. 12/947,545; Office Action dated Jul. 10, 2015.
U.S. Appl. No. 12/947,545; Office Action dated Aug. 25, 2016.
U.S. Appl. No. 12/947,545; Office Action dated Sep. 25, 2012.
U.S. Appl. No. 12/947,545; Office Action dated Nov. 21, 2013.
U.S. Appl. No. 16/730,567; Notice of Allowance dated Aug. 6, 2020.
U.S. Appl. No. 16/730,567; Office Action dated Apr. 17, 2020.
Walsh, Mark; "Target Teams With Shop kick" MediaPost Blogs; Published Nov. 16, 2010; Accessed Nov. 17, 2010; http://mediapost.com/publicationsf?fa=Articles.showArticle&art_aid=13961 0.
Barbaro, Michael, et al. .; "Wal-Mart at Forefront of Hurricane Relief"; Sep. 6, 2005; The Washington Post; pp. 1-4.
*BJ's Wholesale Club Holdings, Inc.* v. *Walmart Apollo, LLC*; AIA Review No. IPR2022-01471; Exhibit/Paper No. 0002; BJ's Wholesale Club Holdings, Inc.; "Petition for Inter Partes Review of U.S. Pat. No. 10,121,133"; USPTO Patent Trial and Appeal Board; Filing Date Sep. 29, 2022; pp. iii-vii and 1-83.
*BJ's Wholesale Club Holdings, Inc.* v. *Walmart Apollo, LLC*; AIA Review No. IPR2022-01471; Exhibit/Paper No. 0006; Walmart Apollo, LLC; "Patent Owner's Preliminary Response"; USPTO Patent Trial and Appeal Board; Filing Date Jan. 13, 2023; pp. i-v and 1-74.
*BJ's Wholesale Club Holdings, Inc.* v. *Walmart Apollo, LLC*; AIA Review No. IPR2022-01471; Exhibit/Paper No. 0007; USPTO Patent Trial and Appeal Board; "Denying Institution of Inter Partes Review 35 U.S.C. § 314"; USPTO Patent Trial and Appeal Board; Filing Date Apr. 12, 2023; 19 pages.
*BJ's Wholesale Club Holdings, Inc.* v. *Walmart Apollo, LLC*; AIA Review No. IPR2022-01471; Exhibit/Paper No. 1002; BJ's Wholesale Club Holdings, Inc.; "Declaration of Micheal I. Shamos, Ph.D"; USPTO Patent Trial and Appeal Board; Filing Date Sep. 29, 2022; pp. i-iii and 1-130.
*BJ's Wholesale Club Holdings, Inc.* v. *Walmart Apollo, LLC*; AIA Review No. IPR2022-01471; Exhibit/Paper No. 2004; USPTO Patent Trial and Appeal Board; "Exhibit, Decision on Appeal in Ex Parte Burns"; USPTO Patent Trial and Appeal Board; Filing Date Jan. 13, 2023; 8 pages.
*BJ's Wholesale Club Holdings, Inc.* v. *Walmart Apollo, LLC*; AIA Review No. IPR2022-01528, IPR2022-01561, IPR2022-01563, IPR2022-01564; Exhibit/Paper No. 0007; BJ's Wholesale Club Holdings, Inc.; "Petitioner's Notice of Ranking Petitions for Inter Partes Review of U.S. Pat. No. 10,803,435"; USPTO Patent Trial and Appeal Board; Filing Date Oct. 17, 2022; pp. 1-6.
*BJ's Wholesale Club Holdings, Inc.* v. *Walmart Apollo, LLC*; AIA Review No. IPR2022-01528, IPR2022-01561, IPR2022-01563, IPR2022-01564; Exhibit/Paper No. 2002; Walmart Apollo, LLC; "Exhibit, Declaration of Matthew W. Johnson"; USPTO Patent Trial and Appeal Board; Filing Date Jan. 13, 2023; pp. 1-5.
*BJ's Wholesale Club Holdings, Inc.* v. *Walmart Apollo, LLC*; AIA Review No. IPR2022-01528, IPR2022-01561, IPR2022-01563, IPR2022-01564; Exhibit/Paper No. 2003; Walmart Apollo, LLC; "Exhibit, Claim 1 to Claim 15 Comparison"; USPTO Patent Trial and Appeal Board; Filing Date Jan. 13, 2023; pp. 1.
*BJ's Wholesale Club Holdings, Inc.* v. *Walmart Apollo, LLC*; AIA Review No. IPR2022-01528, IPR2022-01561, IPR2022-01563; Exhibit/Paper No. 0010; Walmart Apollo, LLC; "Patent Owner's Preliminary Sur-Reply"; USPTO Patent Trial and Appeal Board; Filing Date Feb. 22, 2023; pp. 1-8.
*BJ's Wholesale Club Holdings, Inc.* v. *Walmart Apollo, LLC*; AIA Review No. IPR2022-01528; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 22, 2022; pp. ii-viii and 1-72.
*BJ's Wholesale Club Holdings, Inc.* v. *Walmart Apollo, LLC*; AIA Review No. IPR2022-01528; Exhibit/Paper No. 0006; BJ's Wholesale Club Holdings, Inc.; "Petitioner's Updated Exhibit List"; USPTO Patent Trial and Appeal Board; Filing Date Oct. 17, 2022; pp. i-ii and 1-1.
*BJ's Wholesale Club Holdings, Inc.* v. *Walmart Apollo, LLC*; AIA Review No. IPR2022-01528; Exhibit/Paper No. 0008; Walmart Apollo, LLC; "Patent Owner's Preliminary Response"; USPTO Patent Trial and Appeal Board; Filing Date Jan. 13, 2023; pp. i-iv and 1-44.
*BJ's Wholesale Club Holdings, Inc.* v. *Walmart Apollo, LLC*; AIA Review No. IPR2022-01528; Exhibit/Paper No. 0009; BJ's Wholesale Club Holdings, Inc .; "Petitioner's Reply to Patent Owner Preliminary Response"; USPTO Patent Trial and Appeal Board; Filing Date Feb. 15, 2023; pp. 1-6.
*BJ's Wholesale Club Holdings, Inc.* v. *Walmart Apollo, LLC*; AIA Review No. IPR2022-01528; Exhibit/Paper No. 0011; USPTO Patent Trial and Appeal Board; "Institution Decision: Decision Granting Institution of Inter Partes Review 35 U.S.C. § 314"; USPTO Patent Trial and Appeal Board; Filing Date Apr. 12, 2023; pp. 2-35.
*BJ's Wholesale Club Holdings, Inc.* v. *Walmart Apollo, LLC*; AIA Review No. IPR2022-01528; Exhibit/Paper No. 0013; Walmart

(56) References Cited

OTHER PUBLICATIONS

Apollo, LLC; "Patent Owner's Objections to Evidence"; USPTO Patent Trial and Appeal Board; Filing Date Apr. 24, 2023; pp. 1-5.
BJ's Wholesale Club Holdings, Inc. v. Walmart Apollo, LLC; AIA Review No. IPR2022-01528; Exhibit/Paper No. 0014; BJ's Wholesale Club Holdings, Inc.; "Objections to Patent Owner's Under 37 C.F.R. 42.64(b)(1) to Evidence Served"; USPTO Patent Trial and Appeal Board; Filing Date Apr. 24, 2023; 3 pages.
BJ's Wholesale Club Holdings, Inc. v. Walmart Apollo, LLC; AIA Review No. IPR2022-01528; Exhibit/Paper No. 1002; BJ's Wholesale Club Holdings, Inc.; "Declaration of Michael Shamos, Ph.D"; USPTO Patent Trial and Appeal Board; Filing Date Sep. 22, 2022; pp. i-v and 1-118.
BJ's Wholesale Club Holdings, Inc. v. Walmart Apollo, LLC; AIA Review No. IPR2022-01561; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 29, 2022; pp. iii-ix and 1-66.
BJ's Wholesale Club Holdings, Inc. v. Walmart Apollo, LLC; AIA Review No. IPR2022-01561; Exhibit/Paper No. 0006; BJ's Wholesale Club Holdings, Inc.; "Petitioner's Updated Exhibit List"; USPTO Patent Trial and Appeal Board; Filing Date Oct. 17, 2023; pp. i-ii and 1-1.
BJ's Wholesale Club Holdings, Inc. v. Walmart Apollo, LLC; AIA Review No. IPR2022-01561; Exhibit/Paper No. 0008; Walmart Apollo, LLC; "Patent Owner's Preliminary Response"; USPTO Patent Trial and Appeal Board; Filing Date Jan. 13, 2023; pp. i-iii and 1-44.
BJ's Wholesale Club Holdings, Inc. v. Walmart Apollo, LLC; AIA Review No. IPR2022-01561; Exhibit/Paper No. 0009; BJ's Wholesale Club Holdings, Inc.; "Petitioner's Reply to Patent Owner Preliminary Response"; USPTO Patent Trial and Appeal Board; Filing Date Feb. 15, 2023; pp. 1-6.
BJ's Wholesale Club Holdings, Inc. v. Walmart Apollo, LLC; AIA Review No. IPR2022-01561; Exhibit/Paper No. 0011; USPTO Patent Trial and Appeal Board; "Institution Decision: Deny"; USPTO Patent Trial and Appeal Board; Filing Date Apr. 12, 2023; pp. 2-30.
BJ's Wholesale Club Holdings, Inc. v. Walmart Apollo, LLC; AIA Review No. IPR2022-01561; Exhibit/Paper No. 1002; BJ's Wholesale Club Holdings, Inc.; "Declaration of Michael Shamos, Ph.D"; USPTO Patent Trial and Appeal Board; Filing Date Sep. 22, 2022; pp. i-vi and 1-148.
BJ's Wholesale Club Holdings, Inc. v. Walmart Apollo, LLC; AIA Review No. IPR2022-01561; Exhibit/Paper No. 1026; BJ's Wholesale Club Holdings, Inc.; "Plaintiff's Preliminary Disclosure of Asserted Claims and Infringement Contentions to BJ's Wholesale Club Holdings, Inc."; USPTO Patent Trial and Appeal Board; Filing Date Oct. 17, 2022; pp. 1-7.
BJ's Wholesale Club Holdings, Inc. v. Walmart Apollo, LLC; AIA Review No. IPR2022-01563; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 22, 2022; pp. iii-viii and 1-50.
BJ's Wholesale Club Holdings, Inc. v. Walmart Apollo, LLC; AIA Review No. IPR2022-01563; Exhibit/Paper No. 0006; BJ's Wholesale Club Holdings, Inc.; "Petitioner's Updated Exhibit List"; USPTO Patent Trial and Appeal Board; Filing Date Oct. 17, 2022; pp. 1-3.
BJ's Wholesale Club Holdings, Inc. v. Walmart Apollo, LLC; AIA Review No. IPR2022-01563; Exhibit/Paper No. 0007; BJ's Wholesale Club Holdings, Inc.; "Petitioner's Notice of Ranking Petitions for Inter Partes Review of U.S. Pat. No. 10,803,435"; USPTO Patent Trial and Appeal Board; Filing Date Oct. 17, 2022; pp. 1-6.
BJ's Wholesale Club Holdings, Inc. v. Walmart Apollo, LLC; AIA Review No. IPR2022-01563; Exhibit/Paper No. 0008; Walmart Apollo, LLC; "Patent Owner's Preliminary Response"; USPTO Patent Trial and Appeal Board; Filing Date Jan. 13, 2023; pp. i-iii and 1-35.
BJ's Wholesale Club Holdings, Inc. v. Walmart Apollo, LLC; AIA Review No. IPR2022-01563; Exhibit/Paper No. 0009; BJ's Wholesale Club Holdings, Inc.; "Petitioner's Reply to Patent Owner Preliminary Response"; USPTO Patent Trial and Appeal Board; Filing Date Feb. 15, 2023; pp. 1-6.
BJ's Wholesale Club Holdings, Inc. v. Walmart Apollo, LLC; AIA Review No. IPR2022-01563; Exhibit/Paper No. 0011; USPTO Patent Trial and Appeal Board; "Institution Decision: Granting Institution of Inter Partes Review 35 U.S.C. § 314"; USPTO Patent Trial and Appeal Board; Filing Date Apr. 12, 2023; pp. 1-28.
BJ's Wholesale Club Holdings, Inc. v. Walmart Apollo, LLC; AIA Review No. IPR2022-01563; Exhibit/Paper No. 0013; Walmart Apollo, LLC; "Patent Owner's Objections Under 37 C.F.R. § 42.64(b)(1) to Evidence Served"; USPTO Patent Trial and Appeal Board; Filing Date Apr. 24, 2023; pp. 1-5.
BJ's Wholesale Club Holdings, Inc. v. Walmart Apollo, LLC; AIA Review No. IPR2022-01563; Exhibit/Paper No. 0014; BJ's Wholesale Club Holdings, Inc.; "Petitioner's Objections to Patent Owner's Evidence"; USPTO Patent Trial and Appeal Board; Filing Date Apr. 24, 2023; 3 pages.
BJ's Wholesale Club Holdings, Inc. v. Walmart Apollo, LLC; AIA Review No. IPR2022-01563; Exhibit/Paper No. 1002; BJ's Wholesale Club Holdings, Inc.; "Exhibit, Declaration of Michael I. Shamos, Ph.D."; USPTO Patent Trial and Appeal Board; Filing Date Sep. 22, 2022; pp. i-vi and 1-148.
BJ's Wholesale Club Holdings, Inc. v. Walmart Apollo, LLC; AIA Review No. IPR2022-01564; Exhibit/Paper No. 0002; BJ's Wholesale Club Holdings, Inc.; "Petition for Inter Partes Review of U.S. Pat. No. 10,803,435"; USPTO Patent Trial and Appeal Board; Filing Date Sep. 22, 2022; pp. i-vii and 1-75.
BJ's Wholesale Club Holdings, Inc. v. Walmart Apollo, LLC; AIA Review No. IPR2022-01564; Exhibit/Paper No. 0006; BJ's Wholesale Club Holdings, Inc.; "Petitioner's Updated Exhibit List"; USPTO Patent Trial and Appeal Board; Filing Date Oct. 17, 2022; pp. i-iii and 1.
BJ's Wholesale Club Holdings, Inc. v. Walmart Apollo, LLC; AIA Review No. IPR2022-01564; Exhibit/Paper No. 0008; Walmart Apollo, LLC; "Patent Owner's Preliminary Response"; USPTO Patent Trial and Appeal Board; Filing Date Jan. 13, 2023; pp. i-vi and 1-34.
BJ's Wholesale Club Holdings, Inc. v. Walmart Apollo, LLC; AIA Review No. IPR2022-01564; Exhibit/Paper No. 0009; USPTO Patent Trial and Appeal Board; "Institution Decision: Granting Institution of Inter Partes Review 35 U.S.C. § 314"; USPTO Patent Trial and Appeal Board; Filing Date Apr. 11, 2023; pp. 1-48.
BJ's Wholesale Club Holdings, Inc. v. Walmart Apollo, LLC; AIA Review No. IPR2022-01564; Exhibit/Paper No. 0012; BJ's Wholesale Club Holdings, Inc.; "Petitioner's Objections to Patent Owner's Evidence"; USPTO Patent Trial and Appeal Board; Filing Date Apr. 24, 2023; pp. 3 pages.
BJ's Wholesale Club Holdings, Inc. v. Walmart Apollo, LLC; AIA Review No. IPR2022-01564; Exhibit/Paper No. 1021; BJ's Wholesale Club Holdings, Inc.; "Yong English Annotated Drawings Figures 1-11"; USPTO Patent Trial and Appeal Board; Filing Date Sep. 22, 2022; pp. 1-7.
BJ's Wholesale Club Holdings, Inc. v. Walmart Apollo, LLC; AIA Review No. IPR2022-01564; Exhibit/Paper No. 1026; Walmart Apollo, LLC; "Plaintiff's Preliminary Disclosure of Asserted Claims and Infringement Contentions to BJ's Wholesale Club Holdings, Inc."; USPTO Patent Trial and Appeal Board; Filing Date Oct. 17, 2022; pp. 1-7.
Gao, Jerry, et al.; "A 2D Barcode-based Mobile Payment System"; 2009 Third International Conference on Multimedia and Ubiquitous Engineering; 2009; San Jose State University; San Jose; pp. 1-13.
Lichtenstein, Nelson, "The Retail Revolution: How Wal-Mart Created a Brave New World of Business"; 2009; Henry Holt and Company; United States of America; 19 pages.
Merriam-Webster, Inc; "Webster's New College Dictionary"; 2007; Wiley Publishing, Inc.; Cleveland; 3 pages.
Merriam-Webster, Incorporated, "Merriam-Webster's Collegiate Dictionary"; 2000; Tenth Edition; Merriam-Webster, Incorporated; 4 pages.
Microsoft, "Microsoft Computer Dictionary"; 2002; Fifth Edition; Microsoft Press; Redmond; pp. 1-3.

(56) References Cited

OTHER PUBLICATIONS

*Sam's West, Inc. and Walmart Apollo, LLC v. BJ's Wholesale Club Holdings, Inc.*; Document No. 001; Sam's West, Inc.; "Complaint and Demand for Jury Trial and Injunctive Relief with Exhibits"; United States District Court for the Middle District of Florida, Orlando Division; Case No. 6:22-cv-00587; Mar. 22, 2022; 247 pages.

*Sam's West, Inc. and Walmart Apollo, LLC v. BJ's Wholesale Club Holdings, Inc.*; Document No. 035; BJ's Wholesale Club Holdings, Inc.; "Defendant BJ's Wholesale Club Holdings, Inc.'s Motion to Dismiss, with Appendix"; United States District Court for the Middle District of Florida, Orlando Division; Case No. 6:22-cv-00587; Apr. 29, 2022; 30 pages.

*Sam's West, Inc. and Walmart Apollo, LLC v. BJ's Wholesale Club Holdings, Inc.*; Document No. 036; Sam's West, Inc.; "Plaintiffs' Response to Defendant's Motion to Dismiss Under Rule 12(b)(6)"; United States District Court for the Middle District of Florida, Orlando Division; Case No. 6:22-cv-00587; May 20, 2022; pp. 1-20.

*Sam's West, Inc. and Walmart Apollo, LLC v. BJ's Wholesale Club Holdings, Inc.*; Document No. 037-01; Sam's West, Inc.; "Proposed First Amended Complaint and Demand for Jury Trial and Injunctive Relief"; United States District Court for the Middle District of Florida, Orlando Division; Case No. 6:22-cv-00587; May 23, 2022; pp. 1-71.

*Sam's West, Inc. and Walmart Apollo, LLC v. BJ's Wholesale Club Holdings, Inc.*; Document No. 037-06; Sam's West, Inc.; "Exhibit 5"; United States District Court for the Middle District of Florida, Orlando Division; Case No. 6:22-cv-00587; May 23, 2022; pp. 1-33.

*Sam's West, Inc. and Walmart Apollo, LLC v. BJ's Wholesale Club Holdings, Inc.*; Document No. 037-07; Sam's West, Inc.; "Exhibit 6"; United States District Court for the Middle District of Florida, Orlando Division; Case No. 6:22-cv-00587; May 23, 2022; pp. 1-22.

*Sam's West, Inc. and Walmart Apollo, LLC v. BJ's Wholesale Club Holdings, Inc.*; Document No. 037-08; Sam's West, Inc.; "Exhibit 7"; United States District Court for the Middle District of Florida, Orlando Division; Case No. 6:22-cv-00587; May 23, 2022; pp. 1-13.

*Sam's West, Inc. and Walmart Apollo, LLC v. BJ's Wholesale Club Holdings, Inc.*; Document No. 037-09; Sam's West, Inc.; "Exhibit 8"; United States District Court for the Middle District of Florida, Orlando Division; Case No. 6:22-cv-00587; May 23, 2022; pp. 1-14.

*Sam's West, Inc. and Walmart Apollo, LLC v. BJ's Wholesale Club Holdings, Inc.*; Document No. 049; Baker, Magistrate Judge David A.; "Order Denying as Moot 35 Motion to Dismiss for Failure to State a Claim; Granting 37 Motion to Amend Complaint; Denying as Moot 39 Motion for Leave to File a Reply Memorandum in Support of Motion to Dismiss"; United States District Court for the Middle District of Florida, Orlando Division; Case No. 6:22-cv-00587; Jun. 8, 2022; pp. 1-3.

*Sam's West, Inc. and Walmart Apollo, LLC v. BJ's Wholesale Club Holdings, Inc.*; Document No. 054; BJ's Wholesale Club Holdings, Inc.; "Defendant BJ's Wholesale Club Holdings, Inc.'s Motion to Dismiss"; United States District Court for the Middle District of Florida, Orlando Division; Case No. 6:22-cv-00587; Jun. 27, 2022; pp. 1-27.

*Sam's West, Inc. and Walmart Apollo, LLC v. BJ's Wholesale Club Holdings, Inc.*; Document No. 062; Sam's West, Inc.; "Plaintiffs' Response To Defendant's Motion to Dismiss Under Rule 12(B)(6)"; United States District Court for the Middle District of Florida, Orlando Division; Case No. 6:22-cv-00587; Jul. 18, 2022; pp. 1-21.

*Sam's West, Inc. and Walmart Apollo, LLC v. BJ's Wholesale Club Holdings, Inc.*; Document No. 067; BJ's Wholesale Club Holdings, Inc.; "Defendant BJ's Wholesale Club Holdings, Inc.'s Reply in Support of its Motion to Dismiss"; United States District Court for the Middle District of Florida, Orlando Division; Case No. 6:22-cv-00587; Aug. 5, 2022; pp. 1-7.

*Sam's West, Inc. and Walmart Apollo, LLC v. BJ's Wholesale Club Holdings, Inc.*; Document No. 078; Sam's West, Inc. "Plaintiffs' Statement Regarding Defendant's IPR Petitions Pursuant to Court's Notice of Hearing"; United States District Court for the Middle District of Florida, Orlando Division; Case No. 6:22-cv-00587; Sep. 7, 2022; pp. 1-10.

*Sam's West, Inc. and Walmart Apollo, LLC v. BJ's Wholesale Club Holdings, Inc.*; Document No. 079; BJ's Wholesale Club Holdings, Inc. "Defendant BJ's Wholesale Club Holdings, Inc.'s Statement Pursuant to Sep. 1, 2022 Order, with Exhibit"; United States District Court for the Middle District of Florida, Orlando Division; Case No. 6:22-cv-00587; Sep. 7, 2022; 21 pages.

*Sam's West, Inc. and Walmart Apollo, LLC v. BJ's Wholesale Club Holdings, Inc.*; Document No. 083; Sam's West, Inc.; "Corrected First Amended Complaint and Demand for Jury Trial and Injunctive Relief"; United States District Court for the Middle District of Florida, Orlando Division; Case No. 6:22-cv-00587; Sep. 19, 2022; pp. 1-72.

*Sam's West, Inc. and Walmart Apollo, LLC v. BJ's Wholesale Club Holdings, Inc.*; Document No. 085; Sam's West, Inc.; "Plaintiffs' Short Form Motion to Compel Responses to Interrogatory Nos. 2, 5, 6, and 11, with Exhibits"; United States District Court for the Middle District of Florida, Orlando Division; Case No. 6:22-cv-00587; Sep. 22, 2022; 48 pages.

*Sam's West, Inc. and Walmart Apollo, LLC v. BJ's Wholesale Club Holdings, Inc.*; Document No. 088; Sam's West, Inc. and BJ's Wholesale Club Holdings, Inc.; "Joint Claim Construction Statement, with Exhibit"; United States District Court for the Middle District of Florida, Orlando Division; Case No. 6:22-cv-00587; Sep. 23, 2022; 6 pages.

*Sam's West, Inc. and Walmart Apollo, LLC v. BJ's Wholesale Club Holdings, Inc.*; Document No. 091; BJ's Wholesale Club Holdings, Inc.; "Defendant BJ's Wholesale Club Holdings, Inc.'s Motion to Stay Proceedings Pending Inter Partes Review"; United States District Court for the Middle District of Florida, Orlando Division; Case No. 6:22-cv-00587; Sep. 26, 2022; pp. 1-19.

*Sam's West, Inc. and Walmart Apollo, LLC v. BJ's Wholesale Club Holdings, Inc.*; Document No. 094; BJ's Wholesale Club Holdings, Inc.; "Defendant BJ's Wholesale Club Holdings, Inc.'s Opposition to Plaintiffs' Short Form Motion to Compel, with Exhibits"; United States District Court for the Middle District of Florida, Orlando Division; Case No. 6:22-cv-00587; Sep. 29, 2022; 85 pages.

*Sam's West, Inc. and Walmart Apollo, LLC v. BJ's Wholesale Club Holdings, Inc.*; Document No. 096; Sam's West, Inc.; "Plaintiffs' Response to Defendant BJ's Wholesale Club Holdings, Inc.'s Motion to Stay Proceedings Pending Inter Partes Review, with Exhibits"; United States District Court for the Middle District of Florida, Orlando Division; Case No. 6:22-cv-00587; Oct. 11, 2022; 60 pages.

*Sam's West, Inc. and Walmart Apollo, LLC v. BJ's Wholesale Club Holdings, Inc.*; Document No. 101; Chao-Lee Lin, Joel; "Declaration of Joel Chao-Lee Lin in Support of Plaintiffs' Claim Construction Brief"; United States District Court for the Middle District of Florida, Orlando Division; Case No. 6:22-cv-00587; Oct. 21, 2022; pp. 1-4.

*Sam's West, Inc. and Walmart Apollo, LLC v. BJ's Wholesale Club Holdings, Inc.*; Document No. 102; Sam's West, Inc.; "Plaintiffs' Claim Construction Brief"; United States District Court for the Middle District of Florida, Orlando Division; Case No. 6:22-cv-00587; Oct. 21, 2022; pp. 1-27.

*Sam's West, Inc. and Walmart Apollo, LLC v. BJ's Wholesale Club Holdings, Inc.*; Document No. 108; Baker, Magistrate Judge David A.; "Order Granting in Part and Denying in Part 91 Motion to Stay"; United States District Court for the Middle District of Florida, Orlando Division; Case No. 6:22-cv-00587; Nov. 21, 2022; pp. 1-17.

*Sam's West, Inc. and Walmart Apollo, LLC v. BJ's Wholesale Club Holdings, Inc.*; Document No. 112; BJ's Wholesale Club Holdings, Inc.; "Defendant BJ's Wholesale Club Holdings, Inc.'s Responsive Claim Construction Brief"; United States District Court for the Middle District of Florida, Orlando Division; Case No. 6:22-cv-00587; Nov. 21, 2022; pp. 1-24.

(56) References Cited

OTHER PUBLICATIONS

*Sam's West, Inc. and Walmart Apollo, LLC* v. *BJ's Wholesale Club Holdings, Inc.*; Document No. 114; Baker, Magistrate Judge David A.; "Order Denying Without Prejudice 54 Motion to Dismiss; adopting 109 Report and Recommendations"; United States District Court for the Middle District of Florida, Orlando Division; Case No. 6:22-cv-00587; Feb. 2, 2023; pp. 1-2.
Truta, Filip; "AisleBuyer Announces Self-Checkout iPhone Application"; < https://news.softpedia.com/news/ AisleBuyer-Announces-Self-Checkout-iPhone-Application-152569 .shtml>; Aug. 17, 2010; pp. 1-2.
U.S. Appl. No. 18/217,945, filed Jul. 3, 2023, Nelms David Martin.
Digipay.guru; "Scan & Thru Solution - Fast, Secure & Convenient | DigiPay.Guru"; < https://www.digipay.guru/scan-and-go-self-checkout-payment-solution/>; available at least as early as Dec. 12, 2022; pp. 1-26.
U.S. Appl. No. 12/947,545; Notice of Allowance dated Jan. 18, 2018; 11 pages.
U.S. Appl. No. 12/947,545; Notice of Allowance dated Feb. 8, 2018; 4 pages.
*BJ's Wholesale Club Holdings, Inc.* v. *Walmart Apollo, LLC*; AIA Review No. IPR2022-01528, IPR2022-01563, IPR2022-01564; Exhibit/Paper No. 2009; Walmart Apollo, LLC; "Declaration of Tim A. Williams"; USPTO Patent Trial and Appeal Board; Filing Date Jul. 19, 2023; 108 pages.
*BJ's Wholesale Club Holdings, Inc.* v. *Walmart Apollo, LLC*; AIA Review No. IPR2022-01528, IPR2022-01563, IPR2022-01564; Exhibit/Paper No. 2011; Walmart Apollo, LLC; "Deposition of: Michael Shamos Ph.D"; USPTO Patent Trial and Appeal Board; Filing Date Jul. 14, 2023; pp. 1-108.
ABC7; "Is it legal to search shopping bags when leaving a store?"; < https://abc7news.com/archive/6498833>; Nov. 11, 2008; pp. 1-5.
Houghton Mifflin Company, "The American Heritage College Dictionary"; 2007; Fourth Edition; Houghton Mifflin Company; pp. 1-4.
Colapinto, John; "Stop, Thief!"; Annals of Retail; Aug. 25, 2008; The New Yorker; New York City; pp. 1-24.
Merriam-Webster, Incorporated, "Merriam-Webster's Collegiate Dictionary"; 2006; Eleventh Edition; Merriam-Webster, Incorporated; pp. 1-4.
Illum Magazine; "The Magic of Scanning: Science Behind the QR Code"; USC Viterbi; Feb. 14, 2022; University of Southern California; <https://illumin.usc.edu/the-magic-of-scanning-science-behind-the-qr-code>; pp. 1-4.
Oxford English Dictionary; "code"; Oxford University Press; Sep. 2022; <https://www.oed.com/view/Entry/35578?rskey=4dwr9F&result=1#eid>; pp. 1-6.
Gast, Matthew S.; "802.11 Wireless Networks: The Definitive Guide"; 2002; O'Reilly Media; pp. 1-335.
Oxford English Dictionary; "algorithm"; Oxford University Press; Mar. 2023; <https://www.oed.com/view/Entry/4959?redirectedFrom=algorithm#eid#2>; pp. 1.
Tanenbaum, Andrew S., et al.; "Modern Operating Systems"; 2008; Fourth Edition; Pearson Education, Inc.; 1137 pages.
National Ocean Service; "The Global Positioning System"; <https://oceanservice.noaa.gov/education/tutorial_geodesy/geo09_gps.html>; Mar. 1, 2021; pp. 1-2.
Libretexts; "1.5: Coding Theory"; <https://math.libretexts.org/Bookshelves/Combinatorics_and_Discrete_Mathematics/Combinatorics_(Morris)/01%3A_Introduction/01%3A_What_is_Combinatorics/1.05%3A_Coding_Theory>; available at least as early as Jul. 10, 2023; pp. 1.
*BJ's Wholesale Club Holdings, Inc.* v. *Walmart Apollo, LLC*; AIA Review No. IPR2022-01496; Exhibit/Paper No. 2021; Walmart Apollo, LLC; "Declaration of Matthew W. Johnson"; USPTO Patent Trial and Appeal Board; Filing Date Jul. 14, 2023; 5 pages.
*BJ's Wholesale Club Holdings, Inc.* v, *Walmart Apollo, LLC*; AIA Review No. IPR2022-01496; Exhibit/Paper No. 2007; Walmart Apollo, LLC; "Defendant BJ's Wholesale Club Holdings, Inc.'s Responsive Claim Construction Brief"; United States District Court for the Middle District of Florida, Orlando Division; Filing Date Nov. 21, 2022; 24 pages.
Adobe; "JPEG vs. RAW"; <https://www.adobe.com/creativecloud/file-types/image/comparison/jpeg-vs-raw.html>; available at least as early as Jul. 10, 2023; pp. 1-3.
IBM; "Public key cryptography"; <https://www.ibm.com/docs/en/ztpf/1.1.0.15?topic=concepts-public-key-cryptography>; available at least as early as Jul. 10, 2023; pp. 1.
*BJ's Wholesale Club Holdings, Inc.* v. *Walmart Apollo, LLC*; AIA Review No. IPR2022-01496, IPR2022-01509; Exhibit/Paper No. 2008; Walmart Apollo, LLC; "Deposition of David Hilliard Williams"; USPTO Patent Trial and Appeal Board; Filing Date Jun. 14, 2023; pp. 1-62.
Library of Congress; "MP3 (Mpeg Layer III Audio Encoding)"; <https://www.loc.gov/preservation/digital/formats/ffd/fdd000012.shtml>; available at least as early as Jul. 10, 2023; 1 page.
Wikipedia; "Push Technology"; <https://en.wikipedia.org/wiki/Push_technology >; available at least as early as Jul. 10, 2023; pp. 1-2.
Wikipedia; "Pull Technology"; <https://en.wikipedia.org/wiki/Pull_technology >; available at least as early as Jul. 10, 2023; pp. 1.
*BJ's Wholesale Club Holdings, Inc.* v. *Walmart Apollo, LLC*; AIA Review No. IPR2022-01496; Exhibit/Paper No. 2004; BJ's Wholesale Club Holdings, Inc.; "Declaration of Dr. Darrell Long"; USPTO Patent Trial and Appeal Board; Filing Date Jul. 14, 2023; 126 pages.
*BJ's Wholesale Club Holdings, Inc.* v, *Walmart Apollo, LLC*; AIA Review No. IPR2022-01496; Exhibit/Paper No. 2006; Walmart Apollo, LLC; "Plaintiff's Claim Construction Brief"; United States District Court for the Middle District of Florida, Orlando Division; Filing Date Oct. 21, 2022; 27 pages.
*BJ's Wholesale Club Holdings, Inc.* v. *Walmart Apollo, LLC*; AIA Review No. IPR2022-01528, IPR2022-01563, IPR2022-01564; Exhibit/Paper No. 2017; Walmart Apollo, LLC; "Declaration of Matthew W. Johnson"; USPTO Patent Trial and Appeal Board; Filing Date Jul. 14, 2023; 4 pages.
*Sam's West, Inc. and Walmart Apollo, LLC* v. *BJ's Wholesale Club Holdings, Inc.*; Document No. 117; United States District Court for the Middle District of Florida; "Transcript of hearing RE: Defendant BJ's Wholesale Club Holdings, Inc.'s Motion to Stay Proceedings Pending Inter Partes Review"; United States District Court for the Middle District of Florida, Orlando Division; Case No. 6:22-cv-00587; Mar. 18, 2023; pp. 1-54.
*Sam's West, Inc. and Walmart Apollo, LLC* v. *BJ's Wholesale Club Holdings, Inc.*; Document No. 124; Sam's West, Inc.; "Plaintiff's Motion to Life the Stay"; United States District Court for the Middle District of Florida, Orlando Division; Case No. 6:22-cv-00587; Jun. 14, 2023; 202 pages.
*Sam's West, Inc. and Walmart Apollo, LLC* v. *BJ's Wholesale Club Holdings, Inc.*; Document No. 126; BJ's Wholesale Club Holdings, Inc.; "Defendant BJ's Wholesale Club Holdings, Inc.'s Response to Plaintiff's Motion to Life the Stay"; United States District Court for the Middle District of Florida, Orlando Division; Case No. 6:22-cv-00587; Jun. 28, 2023; 221 pages.
*Sam's West, Inc. and Walmart Apollo, LLC* v. *BJ's Wholesale Club Holdings, Inc.*; Document No. 131; Norway, Magistrate Judge Robert M.; "Order Denying Plaintiffs' Motion to Life the Stay"; United States District Court for the Middle District of Florida, Orlando Division; Case No. 6:22-cv-00587; Jul. 31, 2023; 11 pages.

\* cited by examiner
† cited by third party

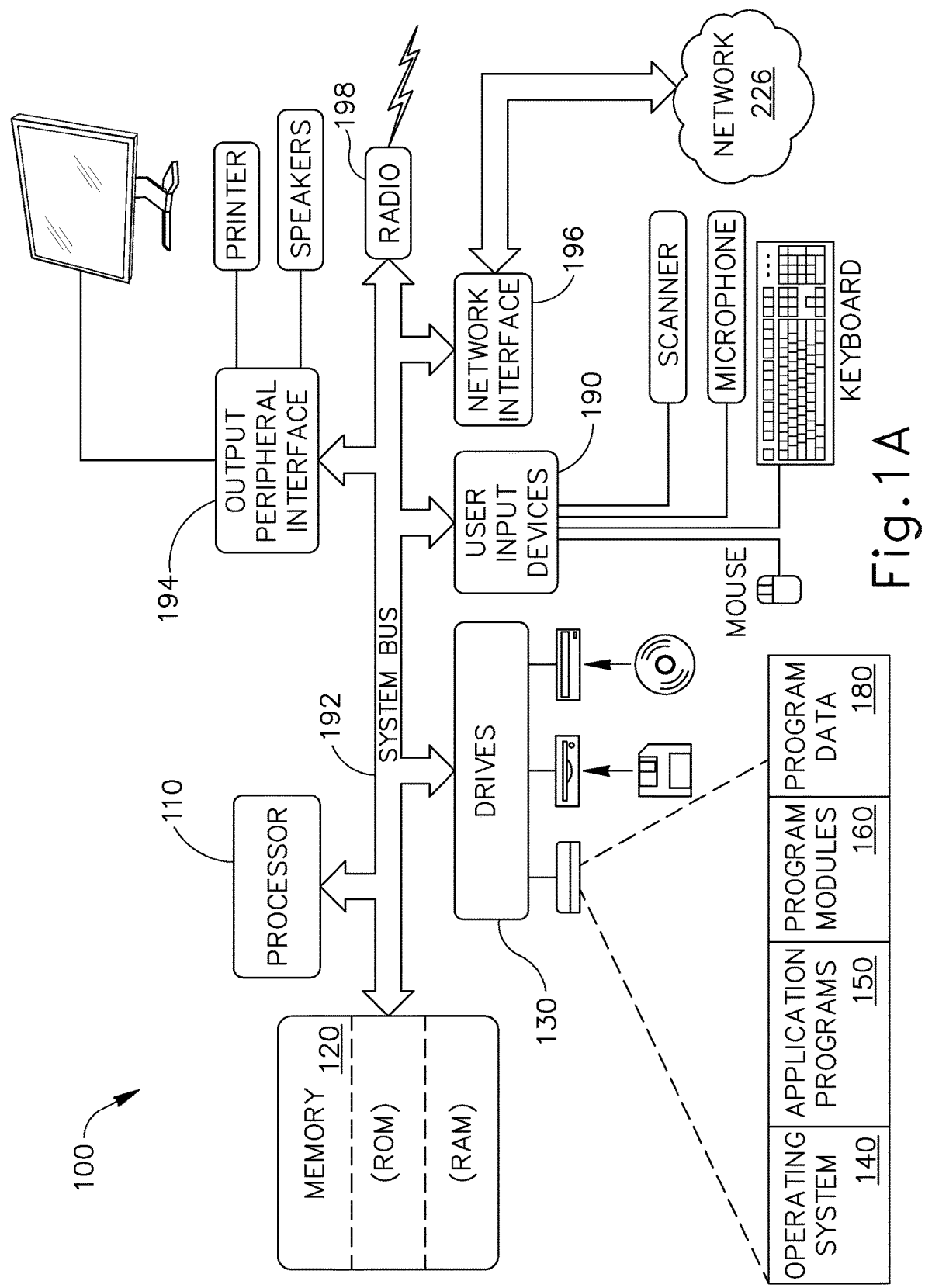

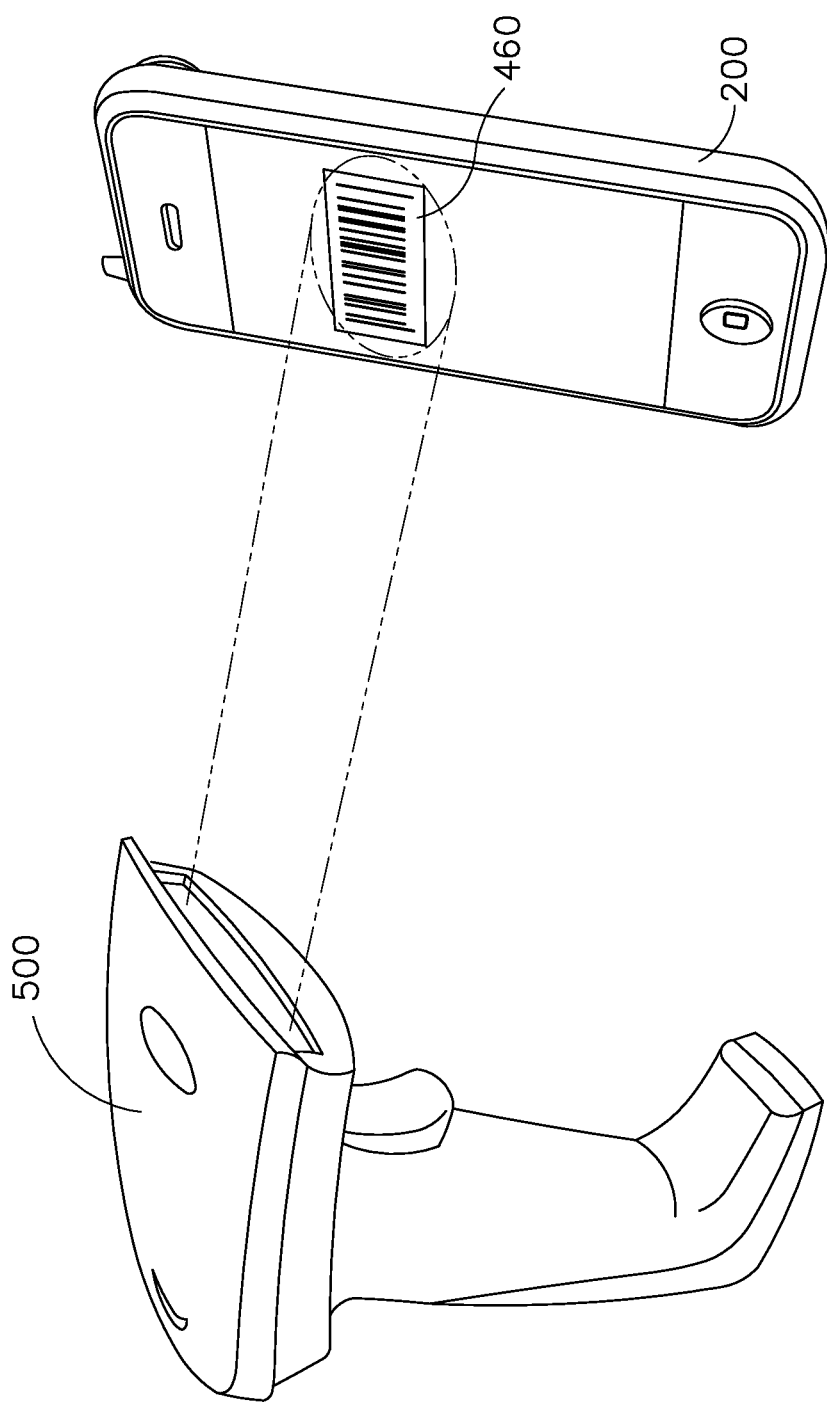

METHOD FOR SELF-CHECKOUT WITH A MOBILE DEVICE

CROSS-REFERENCES TO RELATED APPLICATIONS

This application is a continuation application which claims priority to U.S. patent application Ser. No. 16/730,567, filed on Dec. 30, 2019, which in turn is a continuation application of U.S. patent application Ser. No. 15/956,400, filed on Apr. 18, 2018, which in turn is a divisional application of U.S. patent application Ser. No. 12/947,545, filed on Nov. 16, 2010 which in turn claims the benefit of U.S. Provisional Patent Application No. 61/392,908, filed on Oct. 13, 2010, the contents of all of which are incorporated by reference herein in their entirety.

FIELD OF THE INVENTION

The present invention relates generally to self-checkout from a retail establishment. In particular, the invention relates a method for self-checkout from a retail establishment using a mobile device.

BACKGROUND

Many retail establishments currently allow a customer to check-out and pay for items either by using a traditional cashier who scans each item and then receives tender from the customer for payment of the items, or by using a self-checkout station (SCO) in which the customer scan each item individually at that self-checkout station and then tenders payment to the self-checkout station. In either way, the customer has to shop for items by placing each item in a shopping cart, then has to take the shopping cart to either a traditional cashier or a self-checkout station, often the customer has to wait in line, and then the customer has to remove each item from the shopping cart so that the traditional cashier or a self-checkout station can scan identification information from the item, such as a barcode, and then typically each item is then placed back in the shopping cart upon scanning.

As a result of this process, retail establishments have to invest in cashiers or self-checkout stations and additional time is required from the customer in requiring the customer to complete his purchase by having to go to a cashier or a self-checkout station. It would be desirable to provide a customer and a retail establishment with a method for self-checkout from the retail establishment which did not require having the customer go to a traditional cashier or a self-checkout station for scanning each item.

SUMMARY

In one aspect, a method for purchasing an item using a mobile device is provided. The method includes, but is not limited to, inputting identification information into the mobile device which identifies the item for purchase and generating an order for the item identified by the identification information. The method also includes, but is not limited to, displaying on a display of the mobile device an optical machine-readable representation of the order.

In one aspect, a computer readable memory medium comprising program instructions for purchasing an item using a mobile device having a digital camera is provided. The program instructions are executable by a processor to capture an image of an identifying portion of the item with the digital camera and analyze the identifying portion of the item and generating identification information which identifies the item for purchase. The program instructions are also executable by a processor to generate a virtual shopping cart containing item information representing the item. The item information is retrieved using the identification information. The program instructions are also executable by a processor to transmit payment information from the mobile device to a remote server for acceptance of an order for the item identified by the identification information.

In one aspect, a method for purchasing an item using a mobile device having a digital camera is provided. The method includes, but is not limited to, capturing an image of an identifying portion of the item with the digital camera and analyzing the identifying portion of the item and generating identification information which identifies the item for purchase. The method also includes, but is not limited to, generating a virtual shopping cart containing item information representing the item, generating an order for the item identified by the identification information and tendering payment for the item. The method also includes, but is not limited to, transmitting payment information to a remote server for acceptance, generating a receipt indicating acceptance of the payment information, and displaying the receipt on a display of the mobile device.

In one aspect, a computer readable memory medium comprising program instructions for maintaining and conducting a virtual transaction is provided. The program instructions are executable by a processor to access a session of a virtual terminal sales application upon receiving a point of sale message, load transaction state information into the virtual terminal sales application session, and process the transaction state information using the open session of the virtual terminal sales application.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 1A depicts a block schematic diagram of an exemplary computing system, in accordance with one embodiment of the present invention.

FIG. 1C depicts an illustration of an optical scanning machine reading an optical machine-readable representation of an order display on a mobile device, in accordance with one embodiment of the present invention.

DETAILED DESCRIPTION

Figure 1B:
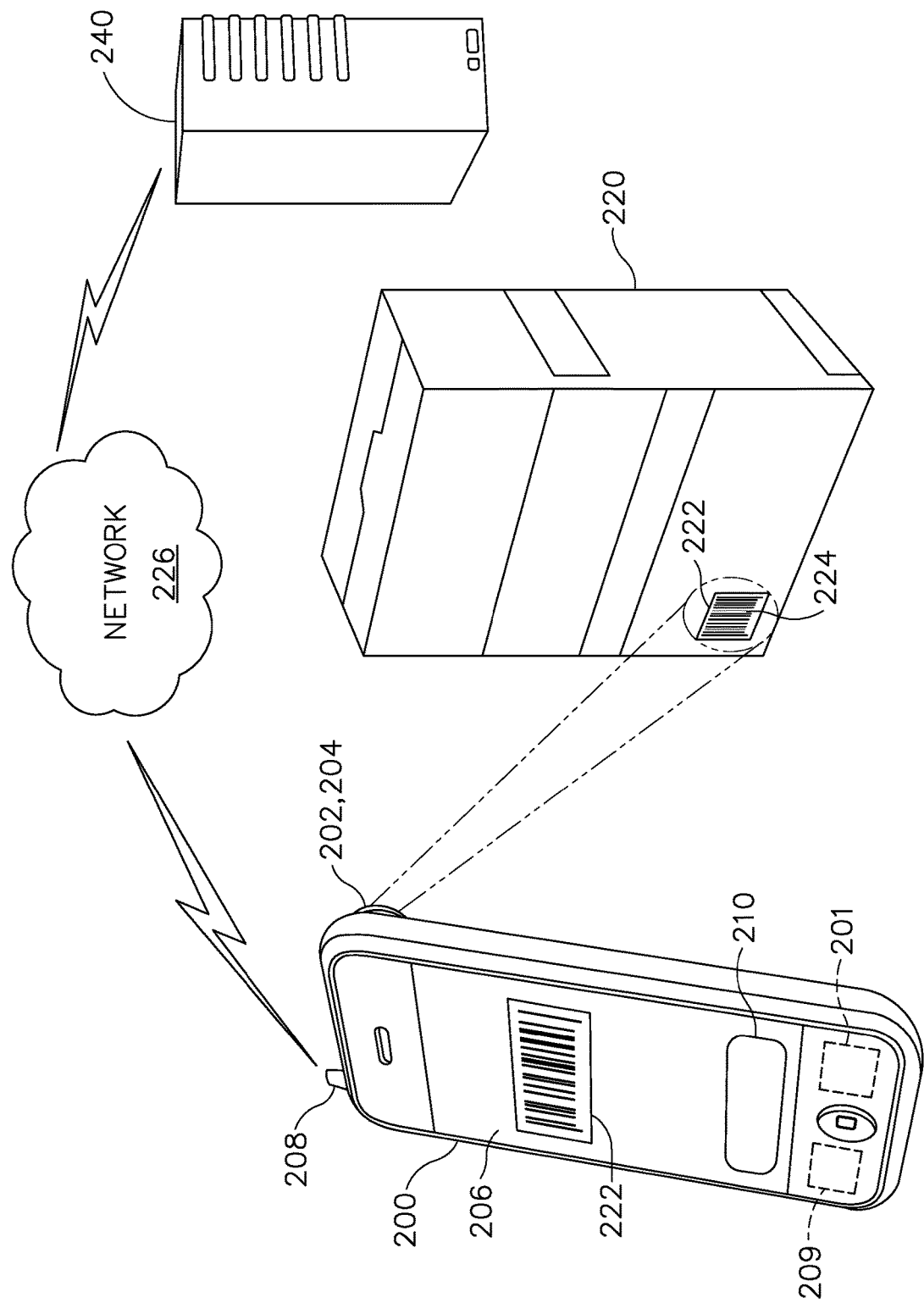
FIG. 1B depicts an illustration of a mobile device receiving identification information from an item and communicating with a remote server, in accordance with one embodiment of the present invention.

The present invention makes use of the discovery that by using a mobile device with item identification information input capabilities and communications capabilities, a user can input identification information into the mobile device which identifies the item for purchase, generate an order for the item identified by the identification information and pay for the order without having to remove each item from a shopping cart and scan the item at a traditional cashier or a self-checkout station. The user has the option of paying for the order by simply providing a cashier with an optical machine-readable representation of an order number identifying an order displayed on a display of the mobile device or transmitting payment information directly from the mobile device to a remote server. In this manner, a user can save time by not having to remove items from a shopping cart for scanning at a traditional cashier or a self-checkout station, and the user can save additional time by bypassing the traditional cashier or self-checkout station completely and paying for an order directly with the mobile device.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

With reference to FIG. 1A, depicted is an exemplary computing system for implementing embodiments. FIG. 1 includes a computer 100, which could be any one of a mobile device 200 or remote server 240. Computer 100 may be a portable device, wherein at least some or all of its components are formed together in a single device which can be carried around by a person. The computer 100 includes a processor 110, memory 120 and one or more drives 130. The drives 130 and their associated computer readable memory medium provide storage of computer readable instructions, data structures, program modules and other data for the computer 100. Drives 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as radio 198, to environments such as the Internet. It will be appreciated that other means of establishing a communications link between computer 100 and other computers may be used.

With reference to FIG. 1B, illustrated is an exemplary representation of a mobile device 200 for purchasing an item 220 from a retailer at a retail establishment. Mobile device 200 includes any portable electronic device having a processor 201 for executing applications and a display 206 for displaying information connected with the processor 201, and includes such devices as a personal desktop assistant (PDA), a portable computer, a mobile telephone, a smartphone, a netbook, and a tablet computer. Display 206 can use any of a variety of types of display technologies, such as a liquid crystal display (LCD), a cathode-ray tube type display, an electronic ink display, a light emitting diode (LED) type display such as an OLED display, and a plasma display. Preferably, the mobile device 200 also includes a communications device 208 and a scanning module 202. The communications device 208 is connected with the processor 201 and capable of sending and receiving information between one or more other computers connected with the mobile device 200. Preferably, communications device 208 is capable of wirelessly transmitting signals to another computer, such as remote server 240, using a radio transmitter and a radio receiver connected with an antenna. The scanning module 202 is capable of receiving identification information 222 from an item 220 and converting the identification information 222 into a format that the processor 201 can read, such as digital data. Preferably, Scanning module 202 includes any device which can capture, receive and process optical information, such as a barcode or any image, and includes devices such as a digital scanner, a digital camera, a video camera, a barcode reader, and any other type of digital or analog imaging device.

Preferably, communications device 208 communicates with another computer 100, such as remote server 240, via a network 226 using a network interface 209. Network interface 209 is connected with processor 201 and communications device 208, and preferably disposed within remote device 200.

Network 226 may include any type of network that is capable of sending and receiving communication signals, including signals for multimedia content, images, data and streaming video. Network 226 may include a data network, such as the Internet, an intranet, a local area network (LAN), a wide area network (WAN), a cable network, and other like systems that are capable of transmitting information, such as digital data, and the like. Network 226 may also include a telecommunications network, such as a local telephone network, long distance telephone network, cellular telephone network, satellite communications network, cable television network and other like communications systems that interact with computer systems to enable transmission of information between mobile device 200 and another computer such as remote server 240. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems.

Network 226 is connected with both mobile device 200 and remote server 240 and allows for information to be transmitted and shared between mobile device 200 and remote server 240. Remote server 240 includes any type of computer which can receive, store, process, and transmit information to another computer and includes devices such as a server based computer system capable of interacting with one or more other computer systems.

In one embodiment, mobile device 200 includes location information processing means which allows the mobile device 200 to determine its location. Location information processing means includes devices such a Global Positioning System (GPS) based device, and methods such as using radio triangulation to determine the location of the mobile device 200. Preferably, mobile device 200 includes input means 210 for entering information from a user into the mobile device 200. Input means includes any device which can assist a user to enter information, such as a keyboard, a mouse, a touchpad, a touchscreen, a joystick, a button, and a dial.

Item 220 includes any item or service which is being sold by a retailer. Preferably, the item 220 is located with a retail establishment or store. Item 220 includes item identification information 222 which is any information on the item 220 which assists in identifying the item 220, such as a barcode 224, a serial number, a name of the item 220, and any text, characters, illustrations, or images on the item 220 which can be used to identify the item 220.

Figure 2A:
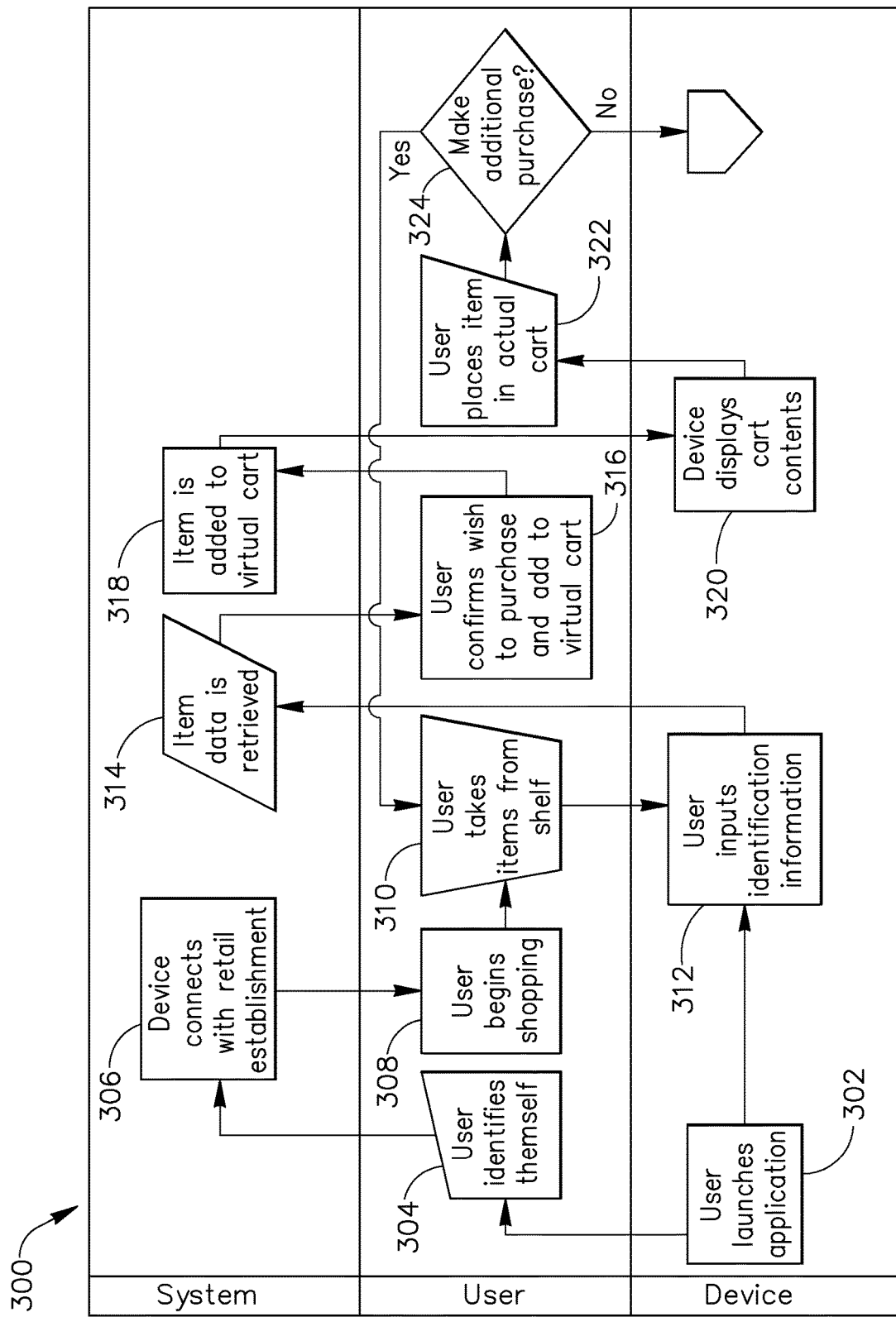
FIGS. 2A and 2B depict flowchart illustrations of methods, apparatus (systems) and computer program products, in accordance with one embodiment of the present invention.
Figure 2B:
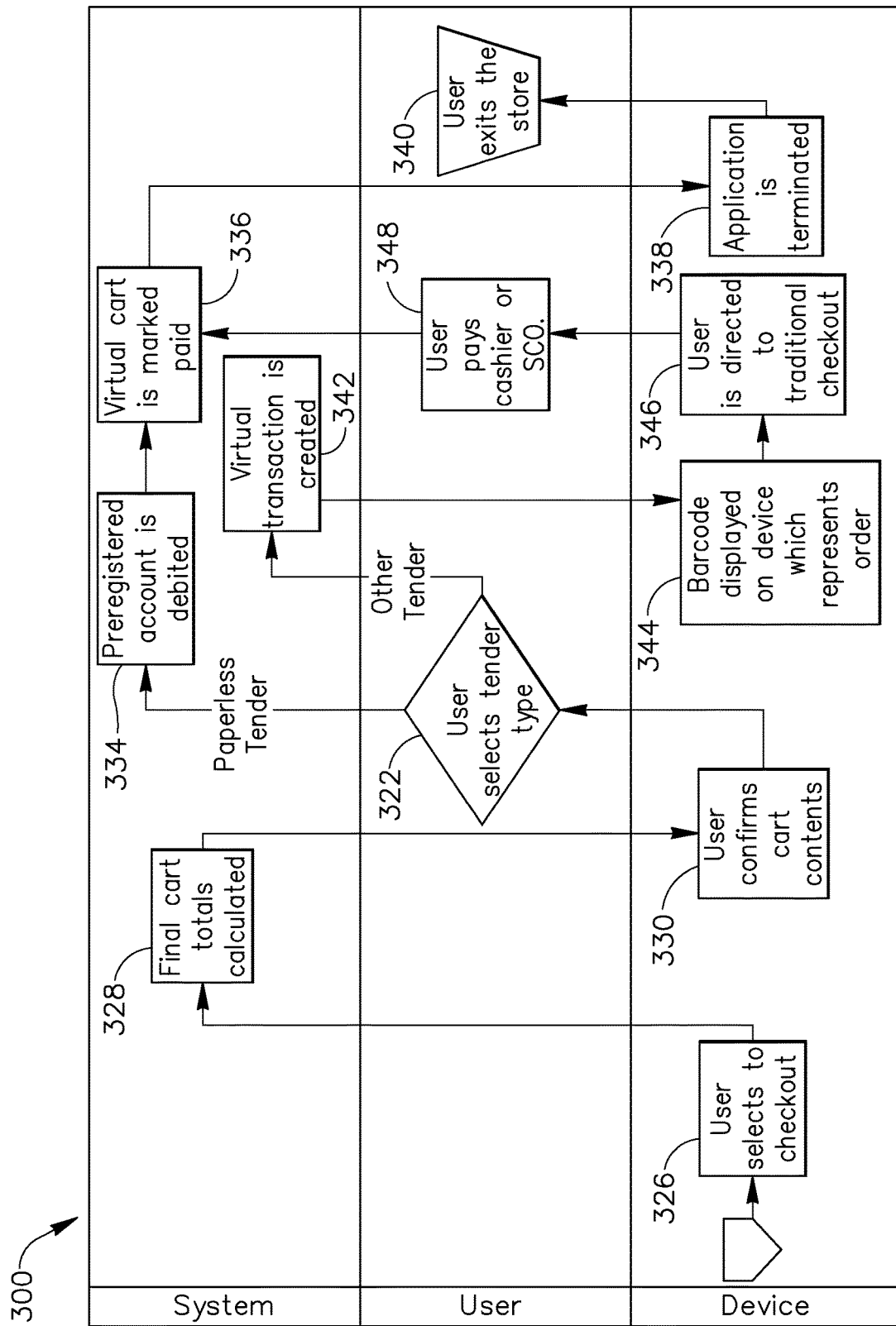

With reference to FIGS. 2A and 2B, in operation, the mobile device 200 is brought into a retail establishment by a customer, or user, and a method 300 for self-checkout with the mobile device 200 is initiated by launching a mobile self-checkout application 400 within the mobile device 200 at block 302. Mobile self-checkout application 400 resides on the mobile device 200 and communicates with a terminal sales application 620 which resides on the server 240. Upon launching the mobile self-checkout application 400, the user may be first prompted to identify himself/herself by entering user identification information into the mobile device 200 via the input means 210. User identification information may include a username, a password, both a username and password. If user is launching the mobile self-checkout application 400 for the first time, the user may be prompted to enter additional user information in addition to user information. Additional user information includes any information which may be used to identify a user, such as user's name, a user's address, a user's telephone number, a user's credit card information or other user financial information, a user's social security number, a user's driver's license number, a user's birthdate, a user's passport number, and other identifying information which may or may not be stored by mobile device 200 or remote server 240.

Figure 3:
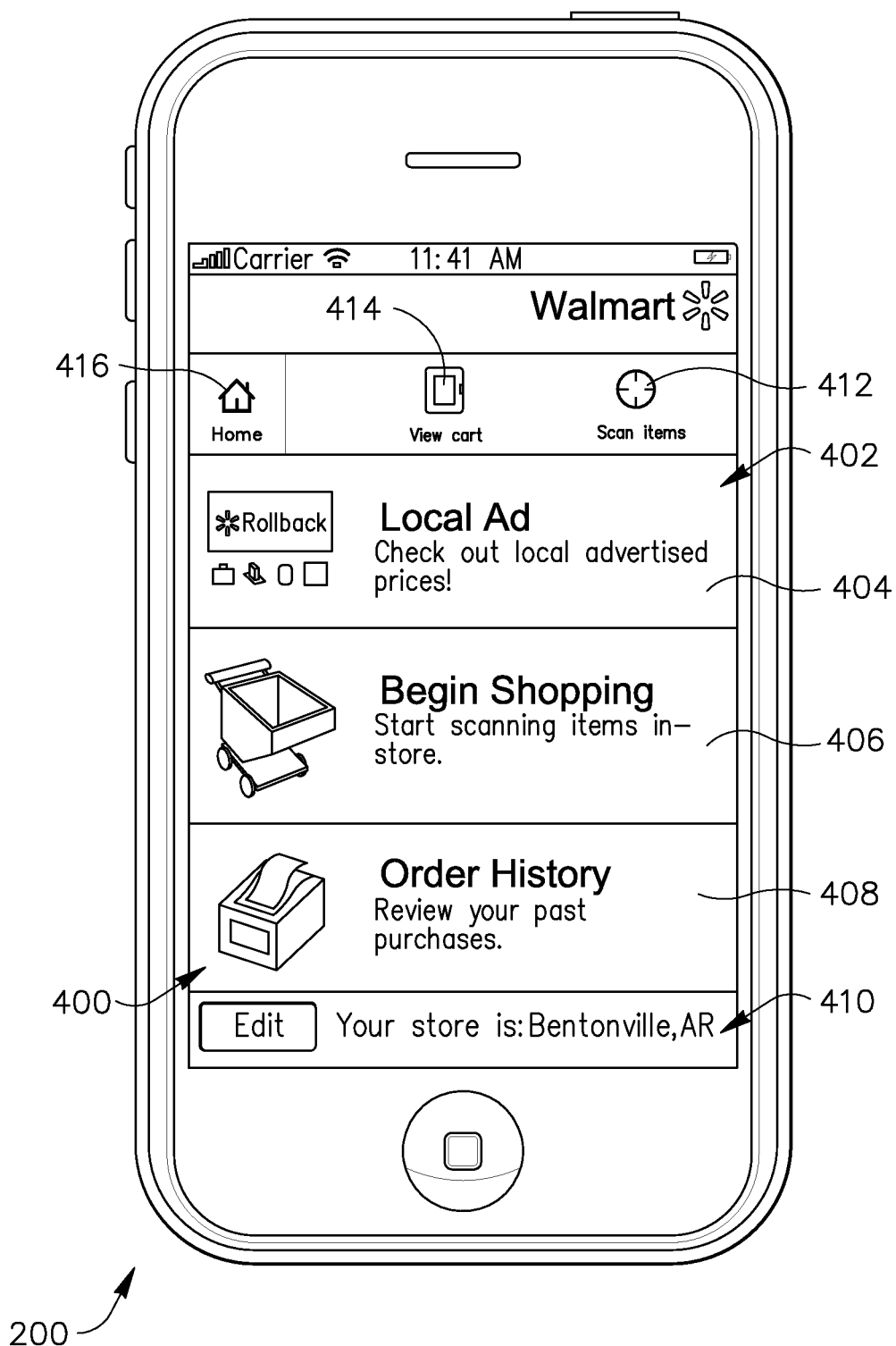
FIGS. 3-18 depict various schematic representations of a mobile self-checkout device running a mobile self-checkout application, in accordance with one embodiment of the present invention.
Figure 18:
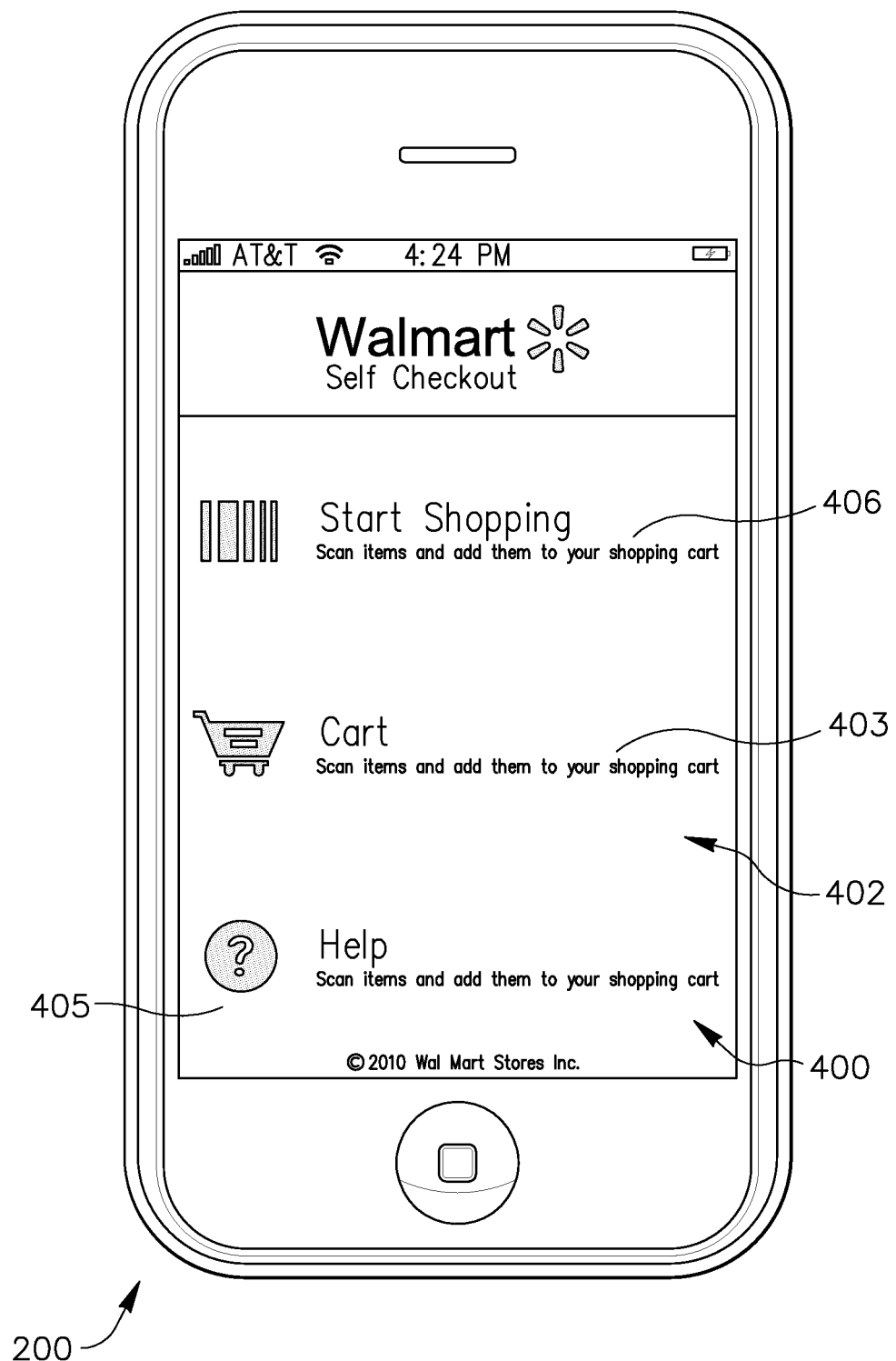

Upon identifying the user, the method 300 then moves to block 306 where mobile device 200 is connected with a computer at the retail establishment, such as remote server 240, via network 226. Upon connecting mobile device 200 with remote server 240, the method 300 then moves to block 308 and the user begins shopping at the retail establishment by walking around the retail establishment and looking for items 220 to purchase. With reference to FIGS. 3 and 18, a home screen 402 is presented to the user by the mobile self-checkout application 400 upon launching the mobile self-checkout application 400 and entering user information. In one embodiment, the home screen 402 includes a local ad button 404 which can provide the user with advertisements specific to the retail establishment in which the user is in, a begin shopping button 406 which allows the user to communicate his intention to begin shopping to the mobile self-checkout application 400 and presents the user with a shopping screen 418, and an order history button 408 which allows the user to review past orders, purchases, or past virtual shopping carts. Additionally, the home screen 402 may display store identifying information 410 which provides information that identifies the specific retail establishment in which the user is in, for example, by stating the city and state in which the retail establishment is in or a store number for the retail establishment. Preferably, the mobile device 200 uses the location information processing means to determine the store identifying information 410.

Figure 8:
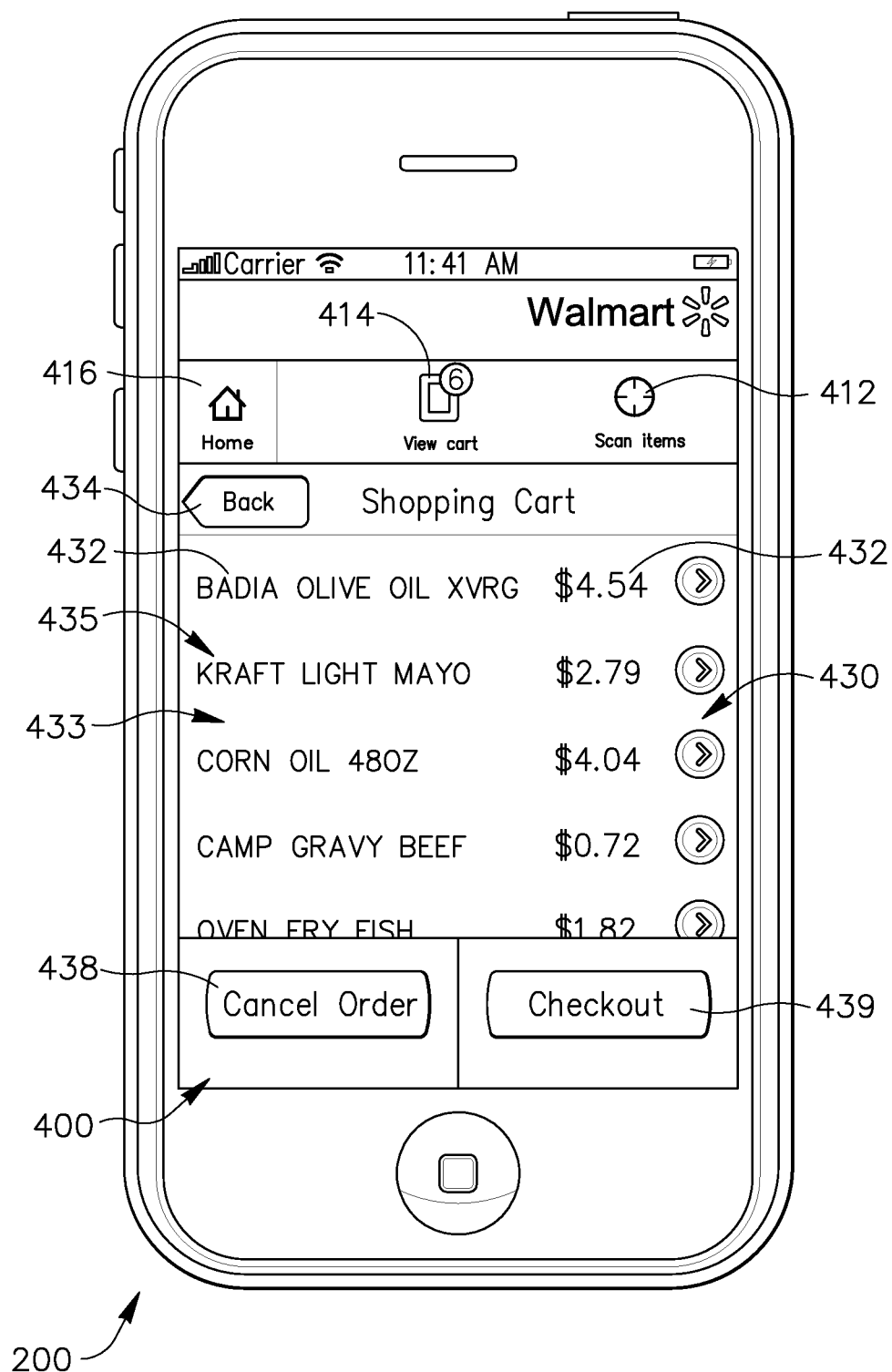

With reference to FIG. 18, in one embodiment, the home screen 402 includes a cart button 403, which when selected, presents the user with a shopping cart screen 430, as shown in FIG. 8. In one embodiment, the home screen 402 includes a help button 405, which when selected, presents the user with a series of help screens which aid the user in using the mobile self-checkout application 400.

Figure 4:
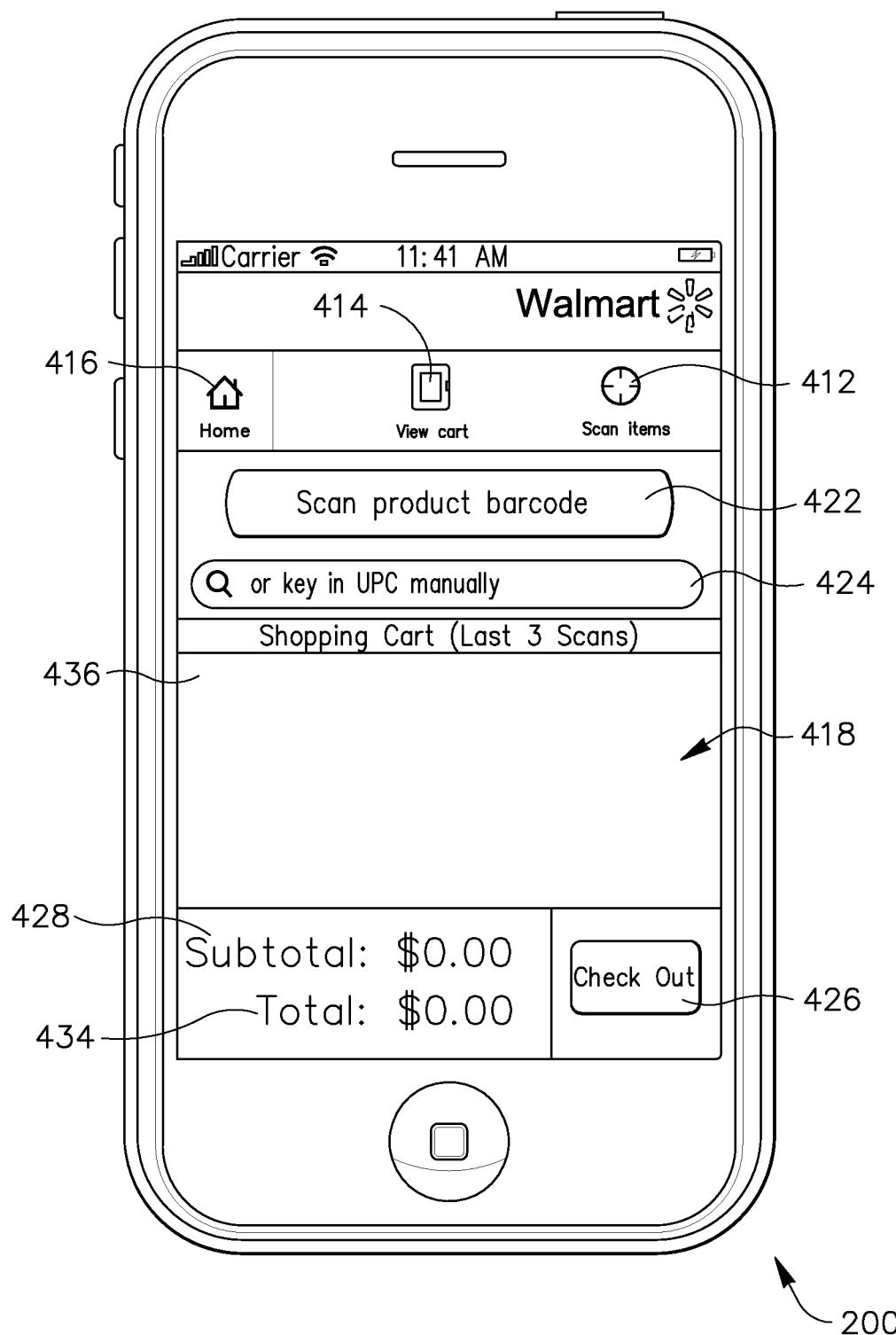
Figure 5:
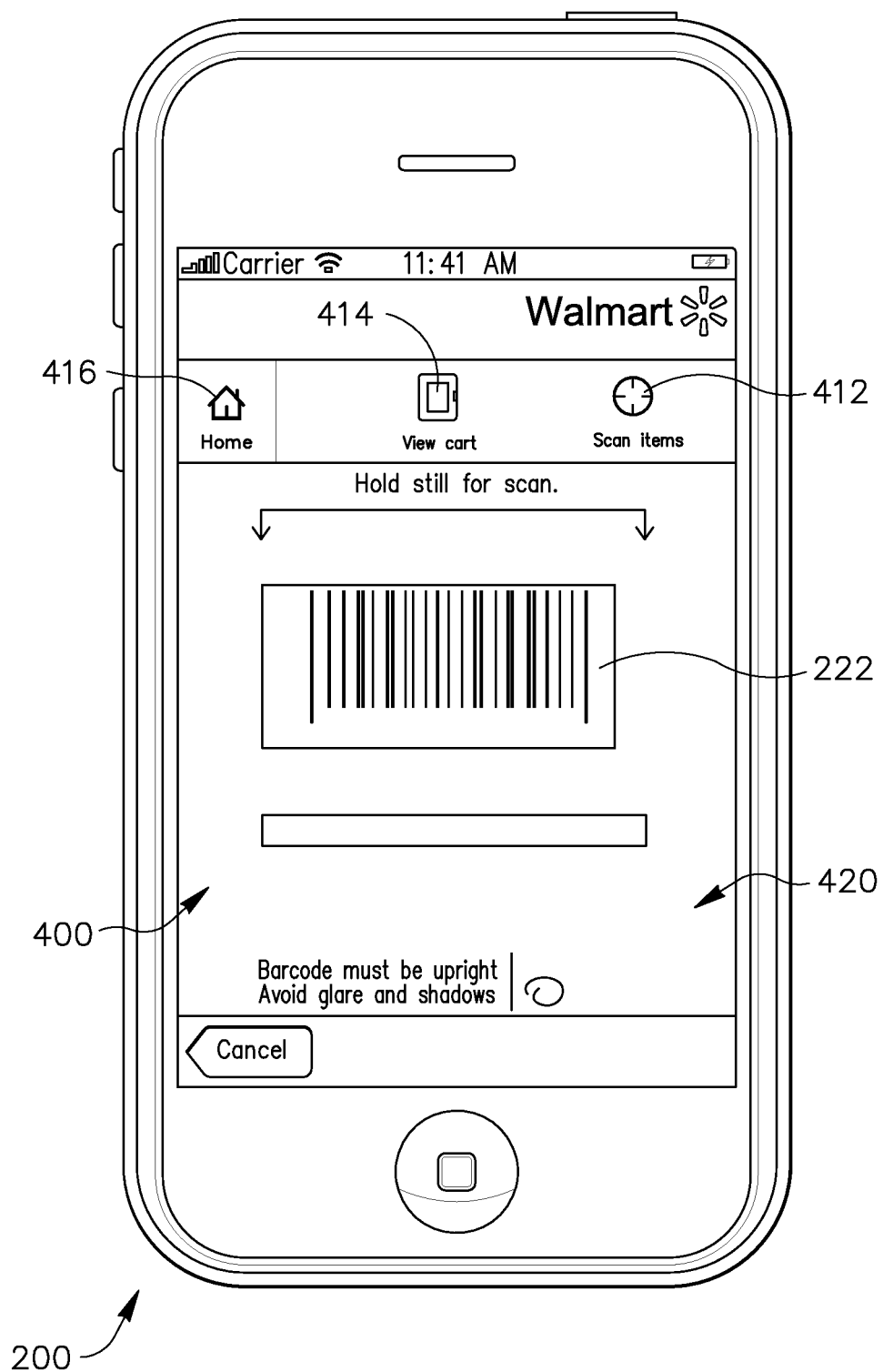

Additionally, mobile self-checkout application 400 includes a scan items button 412, a view cart button 414, and a home button 416. Preferably, buttons 412, 414, and 416 are all present on all or almost all of the screens of the mobile self-checkout application 400, as show in FIGS. 3-15. When selected, the scan items button 412 activates the scanning module 202 and presents the user with a scan items screen 420, as shown in FIG. 5, which allows the user to capture and input identification information 222 from an item 220. When selected, the view cart button 414 presents the user with a shopping cart screen 430, as shown in FIG. 8, which allows the user to view the contents of a virtual shopping cart 433 created by the user and which contains item information 432 representing the item 220. When selected, the home button 416 returns the user to the home screen 402.

Figure 16:
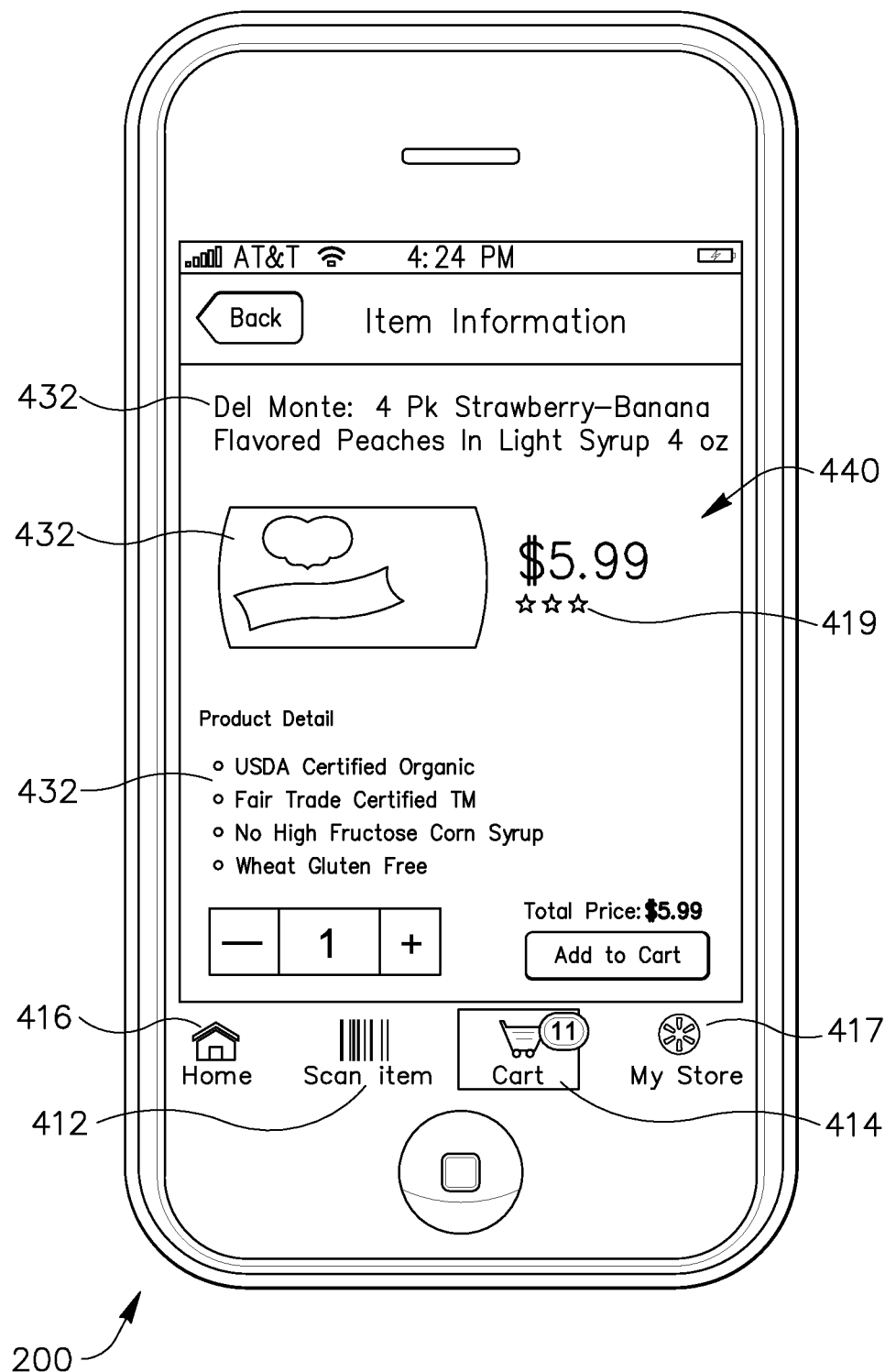

With reference to FIG. 16, in one embodiment, mobile self-checkout application 400 includes a my store button 417 in addition to the scan items button 412, the view cart button 414, and the home button 416. When selected, the my store button 417 presents the user with a store information screen generated by mobile self-checkout application 400 which displays information about the retail establishment that the user is in. Specifically, the store information screen displays information including but not limited to an address of the retail establishment, a phone number of the retail establishment, hours of operation for the retail establishment, services and store number for the retail establishment, and other such information. Preferably, the my store button 417, when selected, also determines the geographic location of the retail location using location information processing means.

Figure 7:
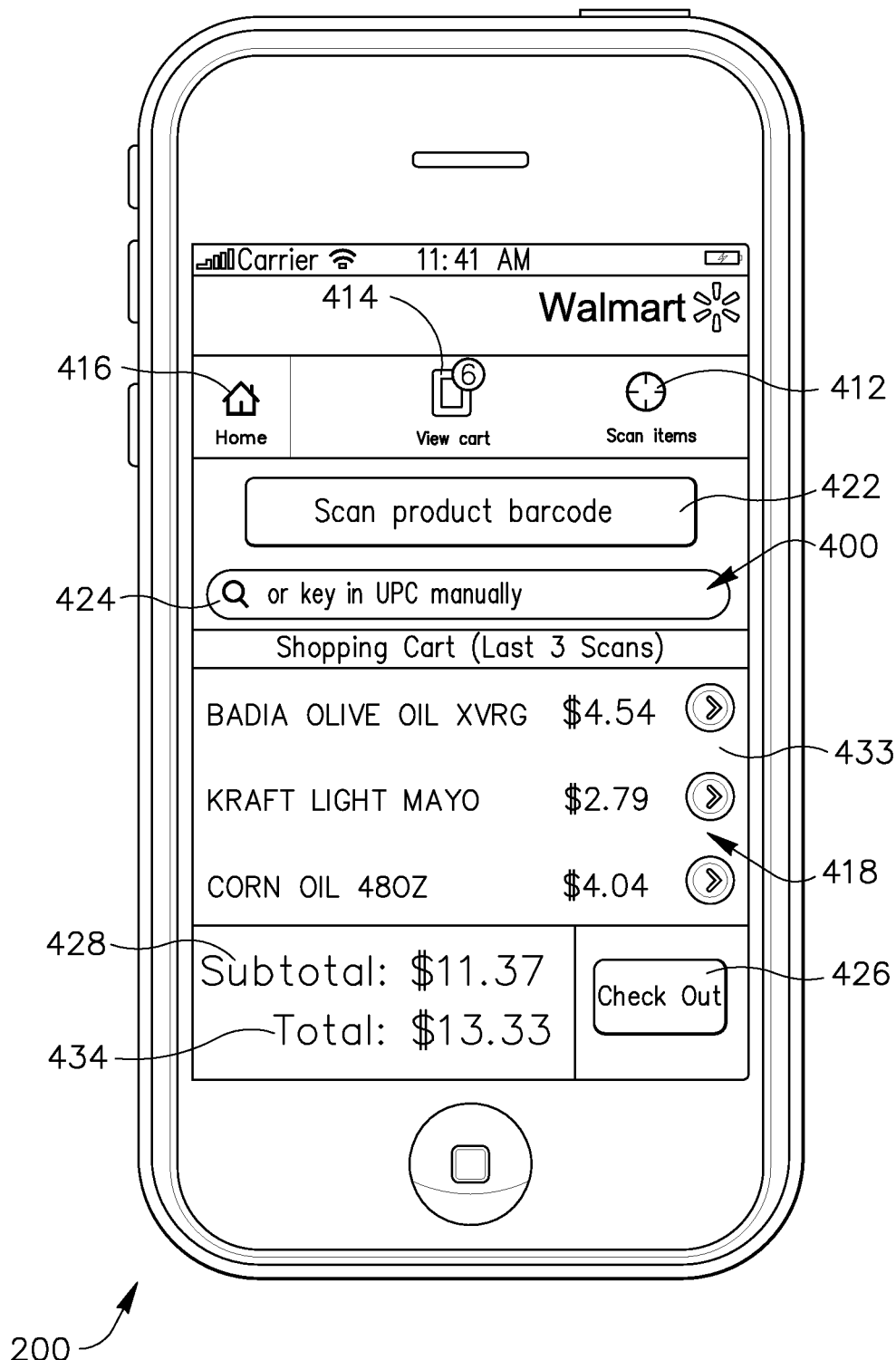
Figure 9:
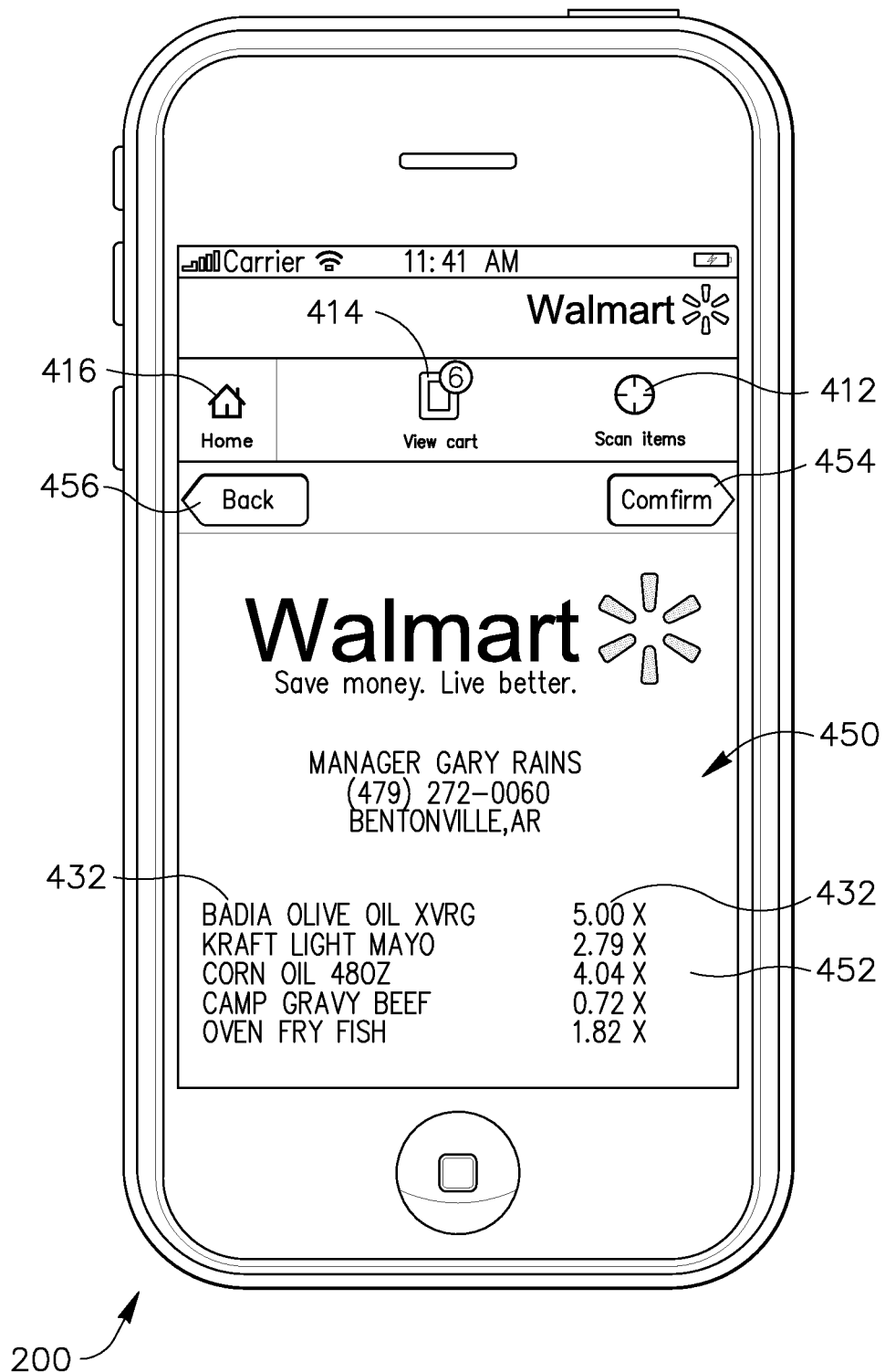

Preferably, once the user has begun shopping at the retail establishment, as shown in block 308, the user communicates his intention to begin shopping to the mobile self-checkout application 400, such as by activating the begin shopping button 406 on the home screen 402. With reference to FIGS. 4 and 7, when selected, the begin shopping button 406 presents the user with a shopping screen 418 having a scan product barcode button 422, a manual identification information box 424, a checkout button 426, subtotal information 428, total information 434, and a partial virtual shopping cart contents window 436. The scan product barcode button 422 activates the scanning module 202 and presents the user with a scan items screen 420, as shown in FIG. 5. The manual identification information box 424 allows a user to manually input identification information 222 into the mobile device 200 which identifies the item 220 for purchase, by inputting, for example, a Universal Product Code (UPC) for the item 220. In one embodiment, UPC information is either manually input or determined automatically from the scan of identification information 222 and then transmitted by mobile device to remote server 240 where a UPC lookup system resides which uses the UPC information to provide the user with item information 432. When selected, the checkout button 426 presents the user with a checkout screen 450, as shown in FIG. 9, which presents the user with the total contents of the virtual shopping cart 433 and the option to confirm the user's intention to purchase those contents. The subtotal information 428 presents the user with a subtotal amount for the contents of the virtual shopping cart 433, and the total information 434 presents the user with a total amount for the contents of the virtual shopping cart 433. The partial virtual shopping cart contents window 436 display a partial view of the contents of the virtual shopping cart 433, such as the last the items entered into the virtual shopping cart 433.

Upon spotting an item to purchase, method 300 then moves to block 310, wherein the user then takes and removes the item 220 from a shelf or stand within the retail establishment. Moving to block 312, the user then inputs identification information 222 into the mobile device 200 which identifies the item 220 for purchase. The identification information 222 can be input manually, such as by entering the information 222 into the identification information box 424, or the identification information 222 can be automatically input by scanning the information 222 using scanning module 202. The user may automatically input identification information 222 by activating scanning module 202. For example user may by activating scanning module 202 by either pressing scan product barcode button 422 or scan items button 412, either of which activates the scanning module 202 and presents the user with a scan items screen 420, as shown in FIG. 5. At scan items screen 420, the user initiates scanning module 202 which then receives identification information 222 from an item 220 and converts the identification information 222 into a format, such as a digital image, so that the processor 201 can read and process the identification information 222. In processing identification information 222, processor 201 may use optical character recognition (OCR) algorithms in order to determine identification information 222 such as a barcode number or a UPC for the item 220.

Upon inputting identification information 222 into the mobile device 200, the identification information 222 is transmitted to the remote server 240 via communications device 208 and received by the remote server 240 at block 314. The remote server 240 may then, at block 314, retrieve item information 432 representing the item 220 using the identification information 222 received from the mobile device 200. The item information 432 may include an item name, an item price, an item review, an item rating, item product details which is a description of the item 220, an image of the item 220, an item tax amount or percentage, or item location information as to where the item 220 is located in the retail establishment.

Figure 6:
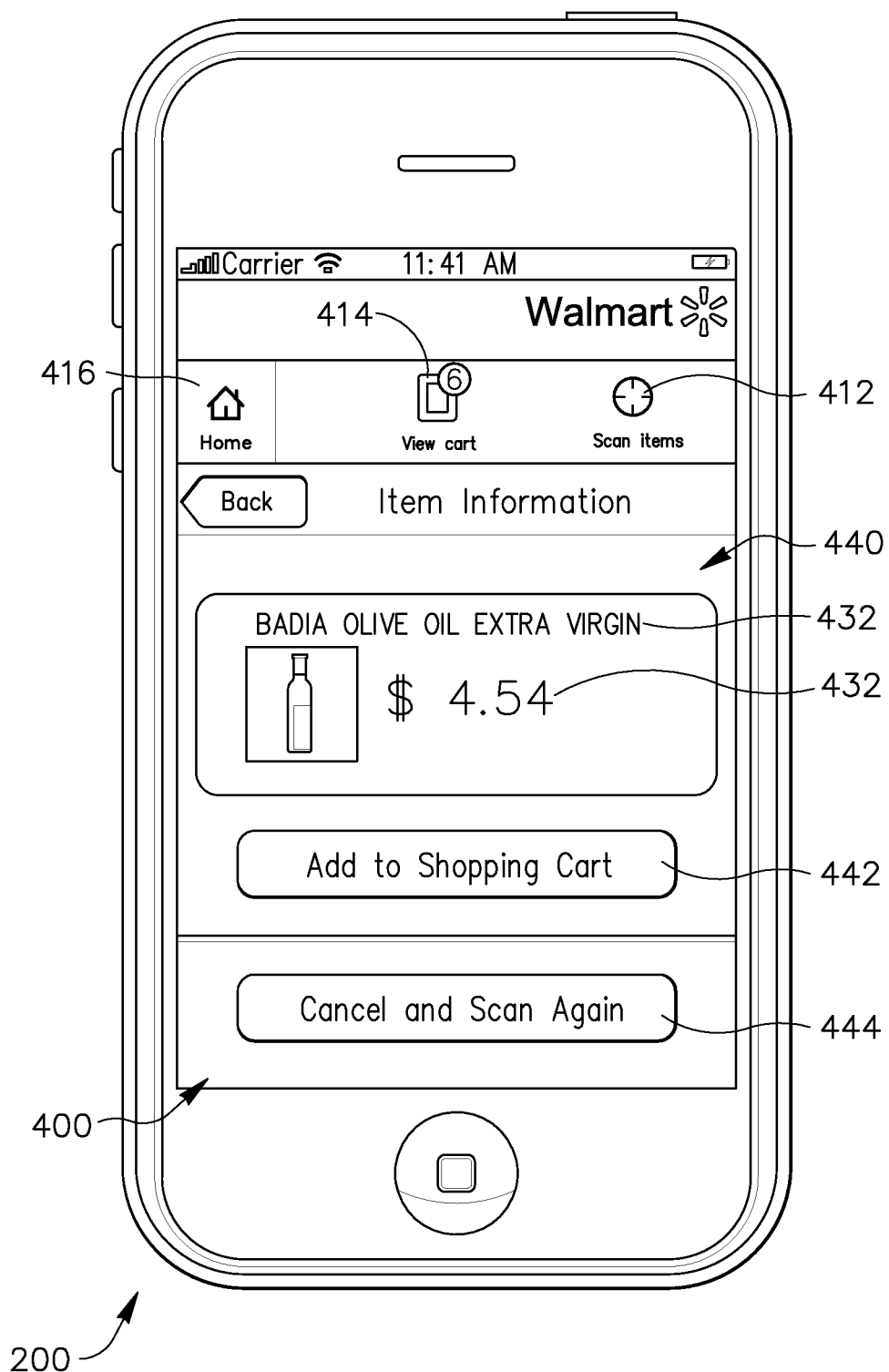
Figure 12:
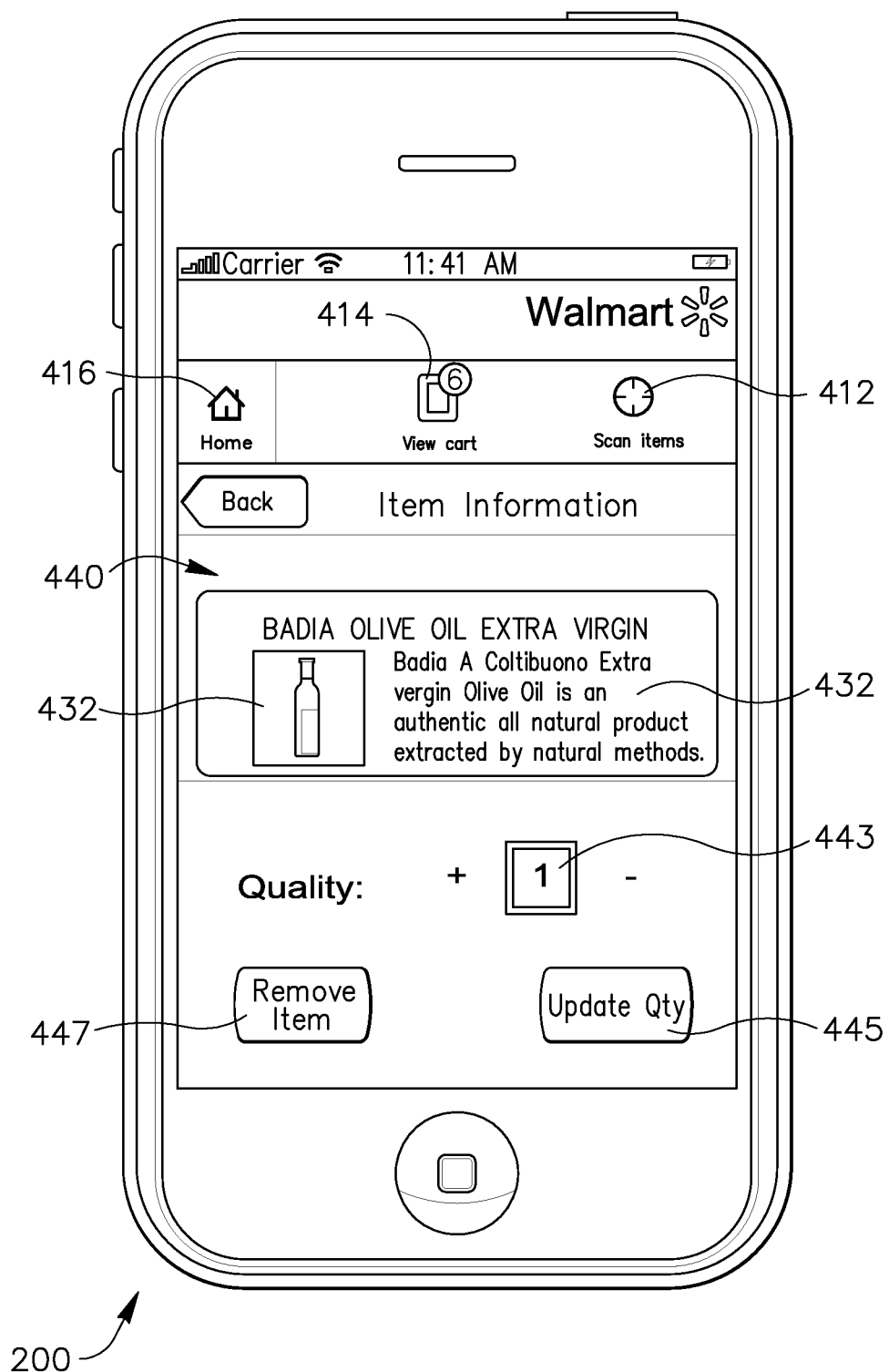

Upon retrieving item information 432, the remote server 240 may then transmit the retrieved item information 432 to the mobile device, whereupon mobile self-checkout application 400 may present the user with an item information screen 440 which displays item information 432 for item 220, as shown in FIGS. 6 and 12. In one embodiment, the user may be prompted to confirm that the item information 432 is related to the item 220 for purchase. Moving to block 316, the user may also be prompted to confirm the user's intent to purchase an item identified by item information 222. For example, the item information 222 may be for an item which is not item 220 selected by the user. In this case the user can inform the mobile self-checkout application 400 that the item information 222 is not accurate or does not relate to item 220.

Figure 13:
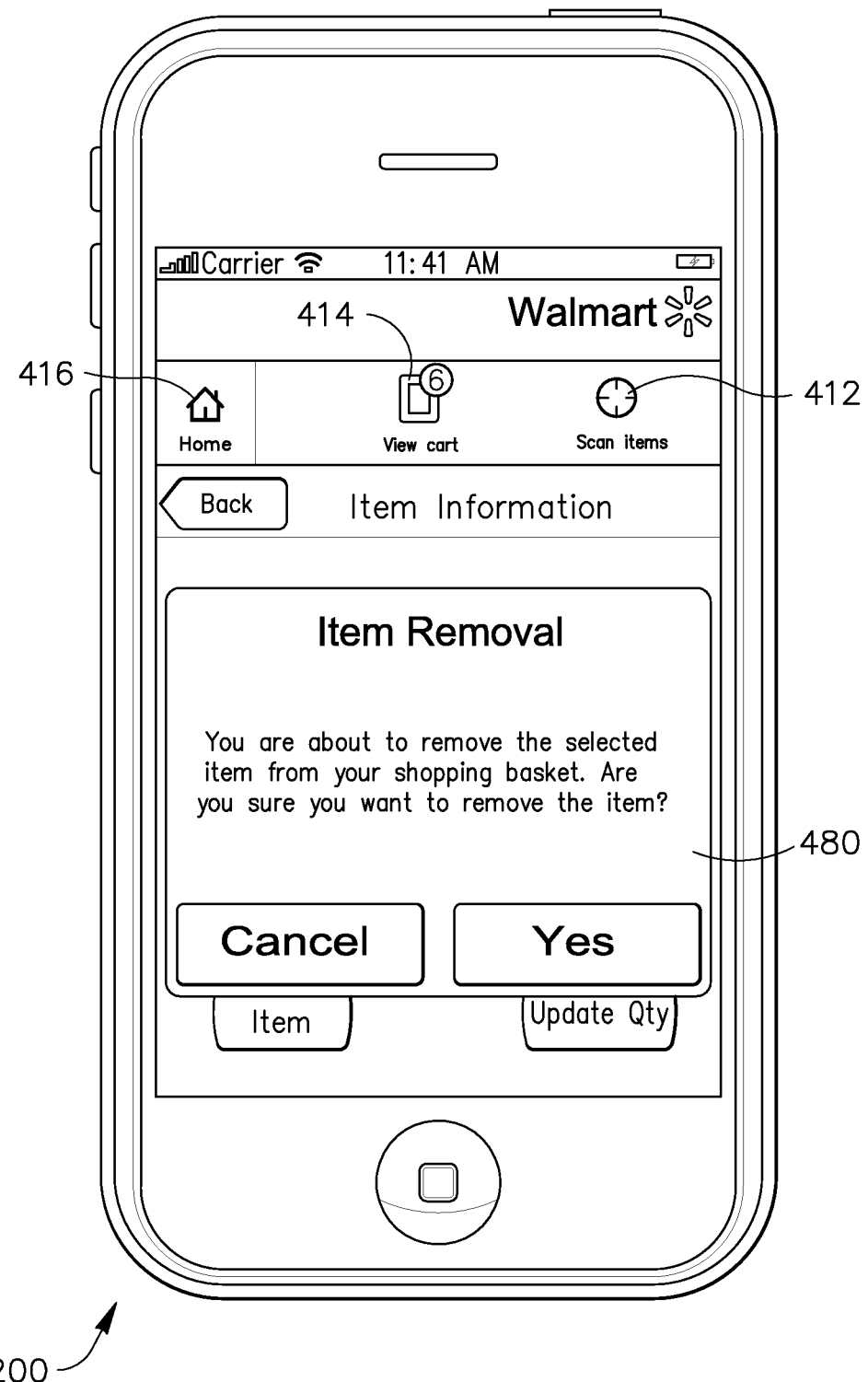

With reference to FIGS. 6 and 12, in one embodiment, item information screen 440 provides the user with an add to shopping cart button 442 or a quantity select button 443 which when selected, generates a virtual shopping cart 433 containing item information 432 representing the item 220. The quantity select button 443 allows the user to add more than one item 220 in the virtual shopping cart 433 and then an update quantity button 445 allows the user to update the quantity of item 220 indicated by the virtual shopping cart 433. Additionally, the user may also be provided with a cancel and scan again button 444, which when selected, does not add item information 432 to a virtual shopping cart 433 and provides the user with the scan items screen 420 again. In one embodiment, a remove item button 447 is provided to the user, which when selected, removes the any item information 222 for item 220 from the virtual shopping cart 433. With reference to FIG. 13, if the remove item button 447 is selected, the user may be prompted with an item removal confirmation screen 480 which prompts the user to confirm his/her desire to remove item 220 along with item information 222 from virtual shopping cart 433.

With reference to FIG. 16, in one embodiment, item information screen 440 provides the user with the option 419 to rate the item 220 and read reviews from other users for the item 220. In one embodiment, mobile self-checkout application 400 provides the user with the option to provide stock information to the remote server 240 indicating whether or not item 220 is in stock at the retail establishment.

If the user confirms his/her intent to purchase item 220, a virtual shopping cart 433 containing item information 432 representing the item 220 is then generated at block 318. In one embodiment, the virtual shopping cart 433 is generated by the mobile device 200 and then transmitted to the remote server 240. In another embodiment, the virtual shopping cart 433 is generated by the remote server 240 and specifically, generated by the terminal sales application 620. Preferably, the virtual shopping cart 433 is generated by the remote server 240, specifically generated by the terminal sales application 620, stored on the remote server, and transmitted to the mobile device 200 for display to the user via display 206. Preferably, any contents in the virtual shopping cart 433, which represent items 220, are kept in the virtual shopping cart 433 for a predefined period of time, after which the contents are deleted. If the method 300, and the shopping process, is interrupted for any reason (for example a phone call is received by the mobile device 200, a text message is received by the mobile device 200, the user wishes to perform another function with the mobile device 200, etc.) the user can resume the method 300 and continue using the virtual shopping cart 433 representing the already selected items 220 for a predefined period of time. In one embodiment, mobile self-checkout application 400 provides the user with the option to create and save a shopping list having all the items 220 represented in the virtual shopping cart 433. The shopping list can be created any place, such as a user's home. When using the shopping list in a retail establishment as part of method 300, items 220 may be paired up and removed from the shopping list and then added to the virtual shopping cart 433.

In one embodiment, upon retrieving item information 432, the remote server 240 may then transmit the retrieved item information 432 to the mobile device, whereupon mobile self-checkout application 400 may automatically generate a virtual shopping cart 433 containing item information 432 representing the item 220. Additionally, in one embodiment, upon retrieving item information 432, the remote server 240 may automatically generate a virtual shopping cart 433 containing item information 432 representing the item 220 and transmit that shopping cart along with its contents to the mobile device 200 for display to the user.

Upon generating a virtual shopping cart 433 containing item information 432 representing the item 220 and transmitting that information between the mobile device 200 and the remote server 240, the mobile device 200 then displays a virtual shopping cart 433 along with all of its contents 435 to the user at block 320. In one embodiment, the mobile self-checkout application 400 presents the user with the shopping cart screen 430, as shown in FIG. 8, displaying the contents of the virtual shopping cart 433 to the user using item information 432.

Figure 15:
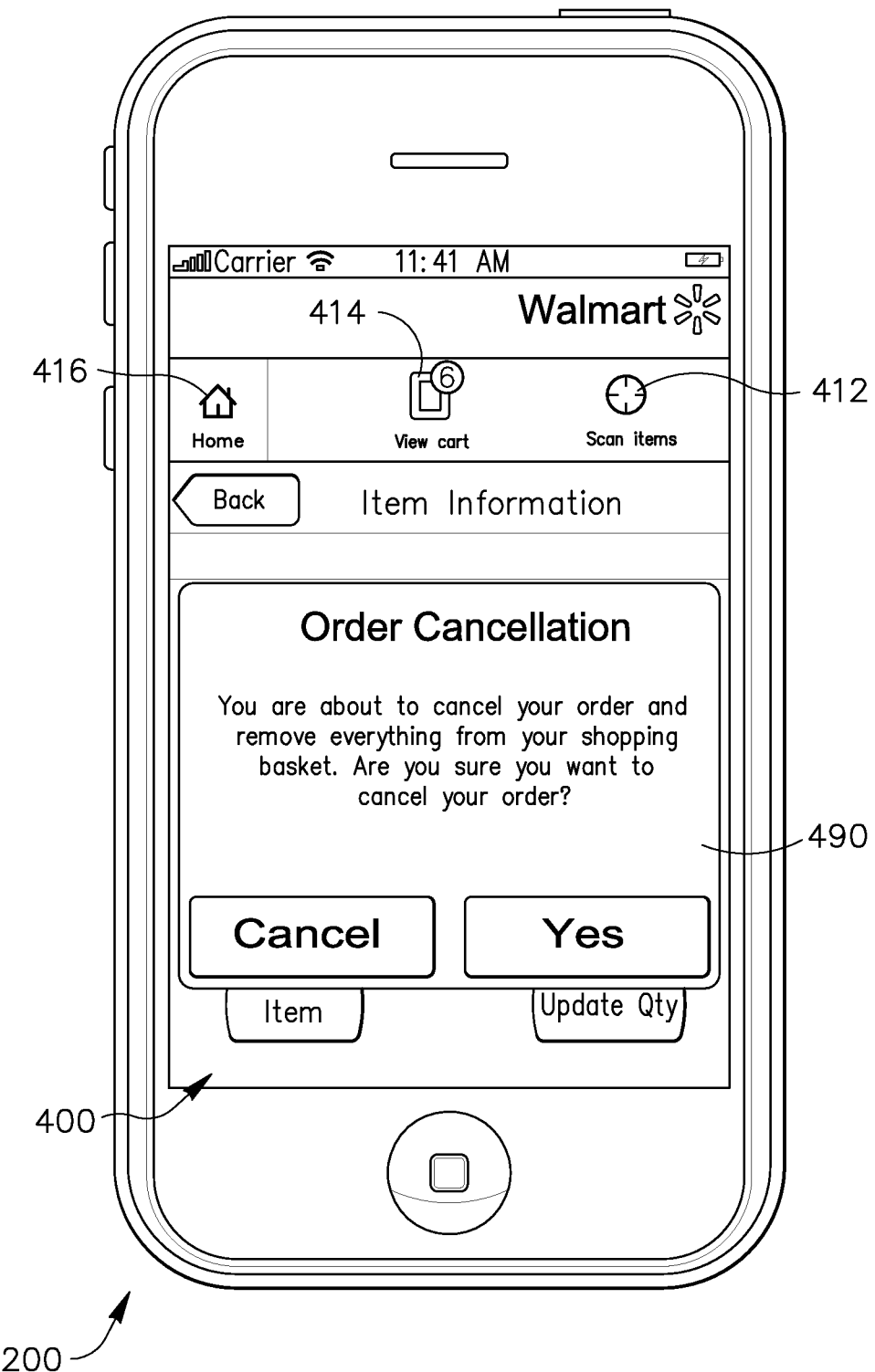
Figure 17:
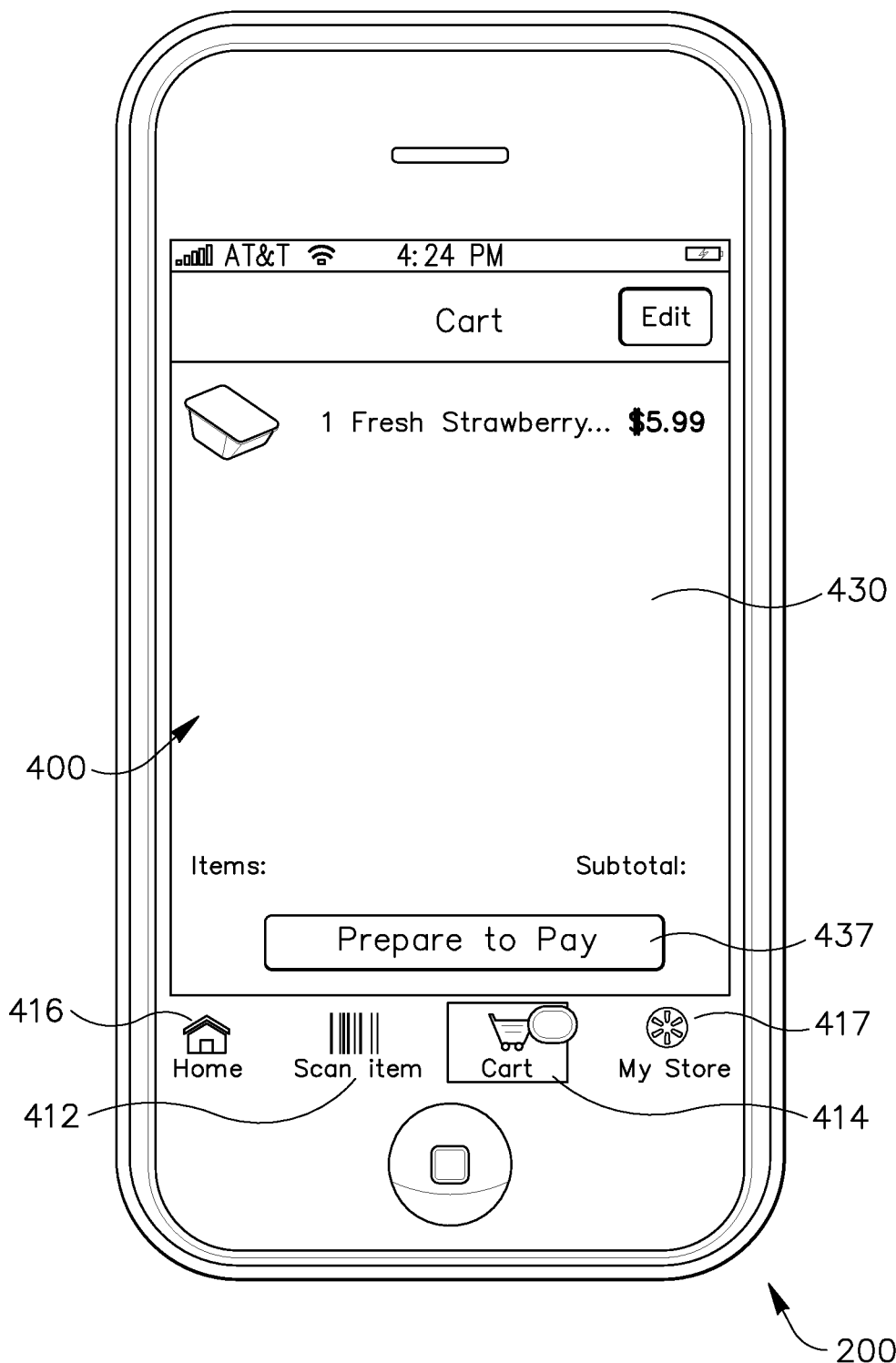

With reference to FIGS. 8 and 17, the shopping cart screen 430 may present the user with the option to purchase the item 220 represented by item information 432 in the virtual shopping cart 433 by pressing a checkout button 439 or a prepare to pay button 437. The shopping cart screen 430 may present the user with the option to continue shopping by pressing a back button 434, wherein the user is presented with the shopping screen 418 again. The shopping cart screen 430 may also present the user with the option to cancel an order 452 altogether by pressing a cancel order button 438, wherein the contents of the virtual shopping cart 433 are emptied and the user is presented with either the shopping screen 418 or the home screen 402 again. With reference to FIG. 15, in one embodiment, when the cancel order button 438 is selected, the user may be prompted with an order cancellation screen 490 which prompts the user to confirm his/her desire to cancel order 452 and empty the virtual shopping cart 433.

As used herein, an order 452 is any request to purchase an item 220. Order 452 is comprised of information received from the mobile self-checkout program 400, such as identification information 222, quantity information indicating how many units of a particular item 220 in the virtual shopping cart 433 a user would like to purchase, user identification information, additional user information, an order number 463, and store identifying information 410 which provides information that identifies the specific retail establishment in which the user is in.

Figure 14:
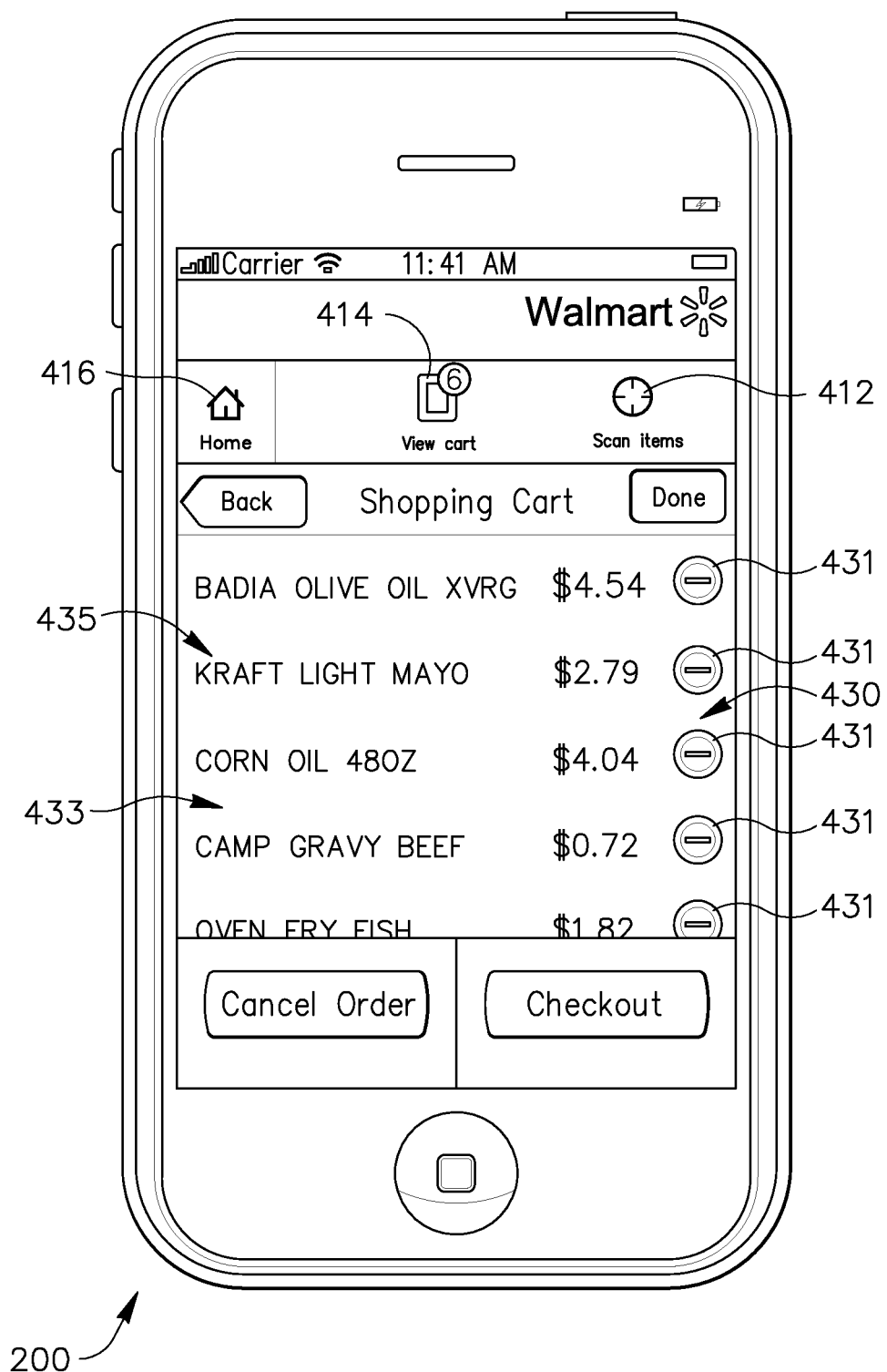

With reference to FIG. 14, in one embodiment, the shopping cart screen 430 includes an item removal button 431 associated with each item 220 represented in the virtual shopping cart 433. When the item removal button 431 is selected, the user may be prompted with item removal confirmation screen 480 which prompts the user to confirm his/her desire to remove item 220 along with item information 222 from virtual shopping cart 433, as shown in FIG. 13.

Upon displaying the contents of the virtual shopping cart 433 to the user at block 320, the user then places the item 220 in an actual shopping cart at block 322. The user is then prompted by the mobile self-checkout application 400 at block 324 and asked if the user would like to continue shopping and purchases additional items 220 or not. In one embodiment, the user is presented with checkout button 439, back button 434, and/or cancel order button 438. If the user wishes to continue shopping, method 300 moves back to block 310. If the user does not wish to continue shopping, method 300 moves to block 326, wherein the user selects the option of checking out, using for example checkout button 439. In one embodiment, instead of pressing a button, such as checkout button 439, back button 434, and/or cancel order button 438, the user may make a hand gesture, a swipe, or other such gesture to activate a feature of mobile self-checkout application 400.

Upon selecting the option to checkout, a total amount for all the contents of the virtual shopping cart 433 is calculated and an order 452 is generated for the item 220 identified by the identification information 222, listed in the virtual shopping cart 433 at block 328. Preferably, an order number 463 associated with the order 452 is also generated. In one embodiment, the order 452 is generated by the mobile device 200 and transmitted to the remote server 240, in another embodiment the order 452 is generated by the remote server 240 and then transmitted to the mobile device 200 for confirmation by the user. Upon generating the order 452 at block 328, the user is then presented with the order 452 at block 330 and asked to confirm the accuracy of the order 452. Preferably, an order confirmation screen 450 is generated by the mobile self-checkout application 400, as shown in FIG. 9. The order confirmation screen 450 includes a confirm button 454 which allows the user to confirm the accuracy of the order 452 and the user's intent to purchase the items 220 identified in the order 452 via identification information 432. The order confirmation screen 450 also includes a back button 456 which when pressed allows to user to go back to the shopping cart screen 430.

Upon confirming a user's intent to purchase items 220 identified by item information 432, method 300 then moves to block 332 wherein the user selects the type of tender and the payment method used to pay for the order 452 which was generated. The user has the choice of providing a variety of types of tender, such as cash, credit card, direct debit from a bank, payment using an online payment service such as PayPal™ or Google Checkout, a gift card, store credit, personal check, money order, or other payment means. The user also has the choice of payment method, either transmitting payment via the mobile device 200 using mobile self-checkout application 400 or providing payment at either a traditional cashier or self-checkout station.

If the user decides to provide payment for order 452 using a traditional cashier or self-checkout station, which may occur when the user wishes to pay with cash, then a virtual transaction is created at block 342 and an optical machine-readable representation 460 of the order 452 which identifies the order 452 is generated and displayed on the display 206 of the mobile device 200 at block 344. The optical machine-readable representation 460 encodes a unique identifier 462 such as an order number 463 or a unique mobile identifier (UMI) which is associated with the mobile device 200 in order to identify order 452, since each optical machine-readable representation 460 generated is unique to each order 452. Each unique mobile identifier (UMI) is specific to a particular mobile device 200, and contains information identifying that particular mobile device 200, such as unique device identifier (UDID) for the mobile device 200, a serial number of the mobile device 200, or some other identifying information for a particular mobile device 200.

The optical machine-readable representation 460 of the order 452 represents the order 452 and encodes identifying information or a unique identifier 462, which includes things such as: an order number 463; customer identifying information which can be used to identify a customer, such as a customer name, a customer number, and a social security number; transaction identifying information which can be used to identify a specific transaction, such as a number or other alphanumeric code; device identifying information that can identify a specific device such as a serial number or a unique device identifier (UDID) for a device such as a mobile phone or mobile computer, and any alphanumeric code or any symbol which may be used associated with and used to identify and retrieve a specific order 452. Preferably, an order number 463 along with the optical machine-readable representation 460 of the order 452 is displayed on the display 206 of the mobile device 200.

The optical machine-readable representation 460 of the order 452 is encoded in such a manner as to allow an optical scanning machine 500, such as barcode reader, to read the optical machine-readable representation 460. A barcode reader, or barcode scanner, is an electronic device for reading printed barcodes. Like a flatbed scanner, a barcode reader consists of a light source, a lens, and a light sensor translating optical impulses into electrical ones. As a result, the optical machine-readable representation 460 of the order 452 is preferably in a form of barcode, such as a linear or 1 D barcode, or a matrix 2D barcode, allowing for a standard barcode reader to read and convert the optical machine-readable representation 460 into digital data which any computer can read. In one embodiment, the optical machine-readable representation 460 of the order 452 is preferably in a form of 1D barcode, such as a 1D barcode having one of the following formats: UPC-A, UPC-E, EAN-13, EAN-8, Code-128, Code-39 and ITF.

Figure 10:
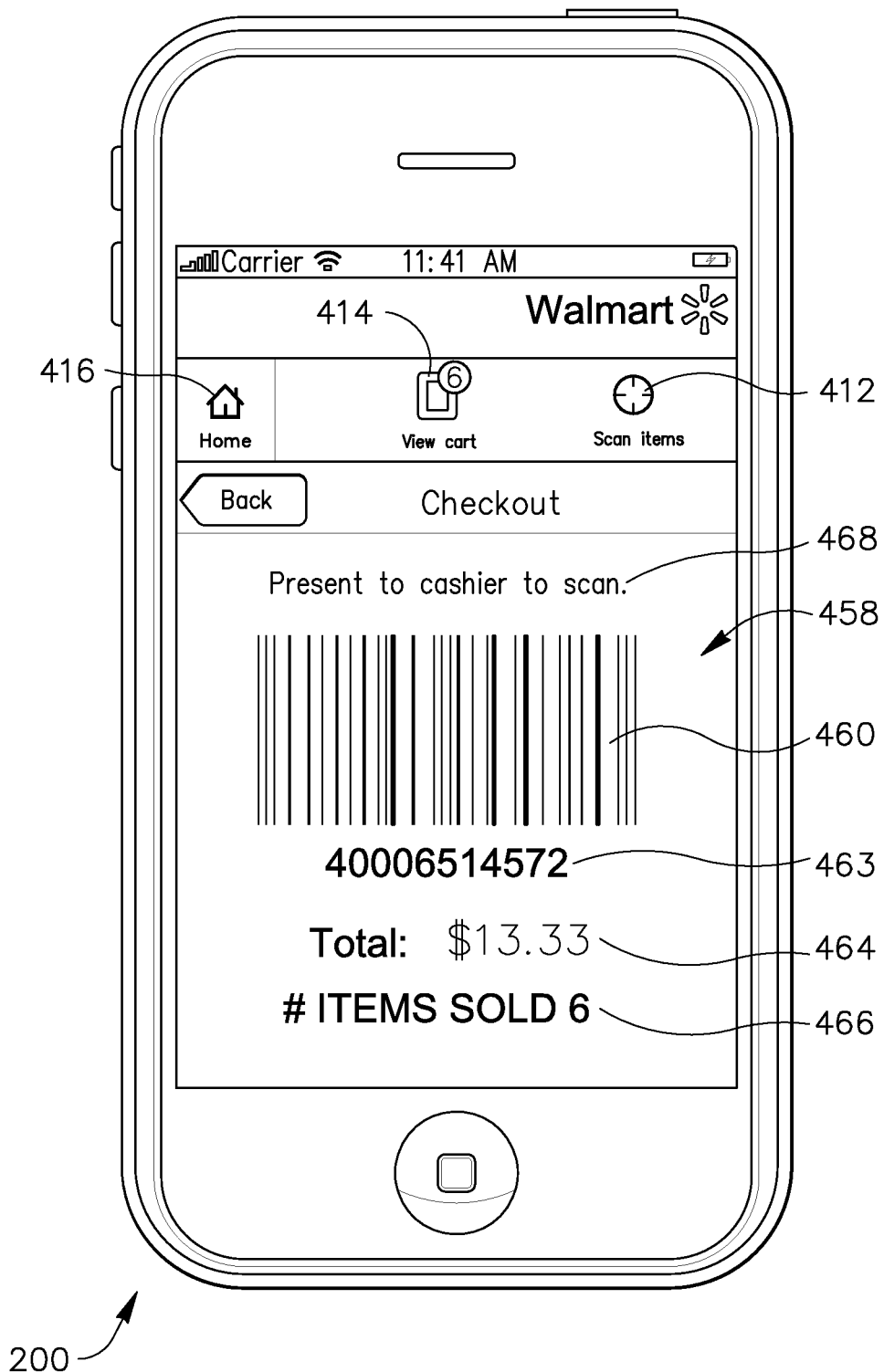
Figure 11:
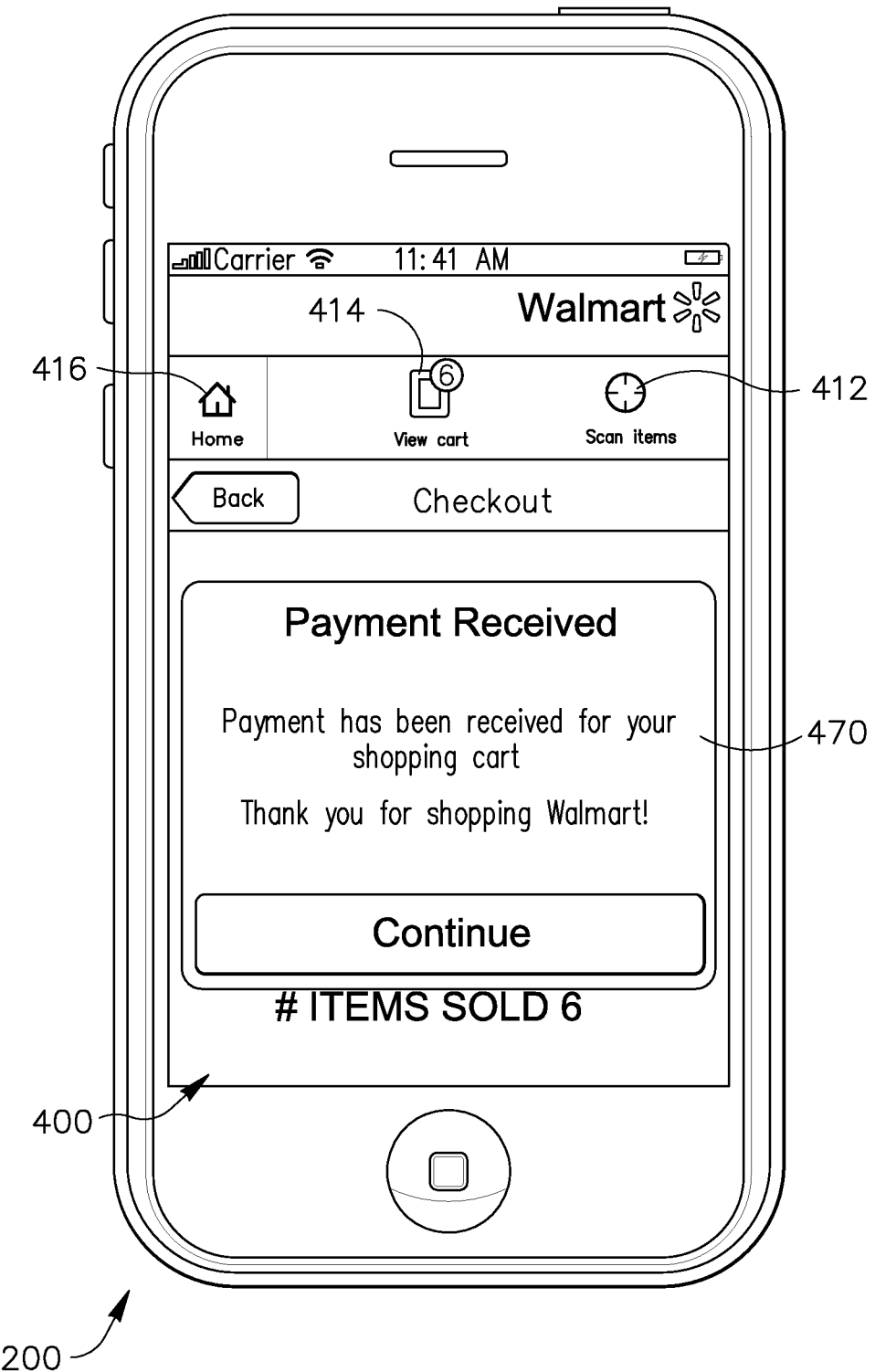

Preferably, upon generating the optical machine-readable representation 460 of the order 452, a machine-readable representation screen 458 is generated by the mobile self-checkout application 400, as shown in FIG. 10. The machine-readable representation screen 458 includes an order number 463 along with the optical machine-readable representation 460 of the order 452, a total payment amount 464 for all the items 220 ordered, and a total amount 466 of items 220 sold. The user is directed by the mobile self-checkout application 400 to present the optical machine-readable representation 460 to a cashier to scan in order to complete a checkout process via message 468 on machine-readable representation screen 458 at block 346. In one embodiment, a unique identifier 462 is provided to the user and displayed on display 206, either alone or printed below the optical machine-readable representation 460. In this embodiment, the user may manually input or key in the unique identifier 462 at a point of sale terminal 600 or provide the unique identifier 462 to a cashier who then can manually enter the unique identifier 462 at the point-of-sale terminal 600.

With reference to FIGS. 1C and 2B, at block 348, the user goes to a traditional cashier or a self-checkout station and presents the optical machine-readable representation 460 to an optical scanning machine 500 which reads the optical machine-readable representation 460, and specifically the unique identifier 462 encoded in the optical machine-readable representation 460. Preferably, the unique identifier 462 is then transmitted to remote server 240 in order to retrieve the order 452 from the remote server 240. Order 452, along with the total payment amount 464, is then transmitted from the remote server 240 to a cash register or other computer operable by the traditional cashier or the self-checkout station. Moving to block 348, the user is then prompted by either the traditional cashier or the self-checkout station to tender payment for the total payment amount 464, whereupon the user then tenders payment to either the traditional cashier or the self-checkout station for the total payment amount 464.

Moving the block 336, upon the user tendering payment, payment information is generated by the cash register or other computer operated by the traditional cashier, or by the self-checkout station and then transmitted to the remote server 240, whereupon the virtual shopping cart 433 is then marked paid and a receipt is generated by the remote server 240, the traditional cashier, and/or the self-checkout station. The receipt is then provided to the user.

Preferably, an acknowledgment that payment has been received is sent to the mobile device 200 from the remote server 240 and displayed to the user via a payment received screen 458 which is generated by the mobile self-checkout application 400, as shown in FIG. 10. In one embodiment, a digital copy of the receipt is transmitted to the user from the remote server 240. Preferably, the digital copy of the receipt is transmitted from the remote server 240 to the mobile device 200 and displayed via the mobile self-checkout application 400. In one embodiment, the digital copy of the receipt is transmitted from the remote server 240 in an email to an email address of the user. Preferably, upon generating and sending an acknowledgment that payment has been received, the server 240 then changes the current virtual shopping cart into a past virtual shopping cart, retrievable by the user via the order history button 408. Sales transaction and receipt information is stored on the remote server 240 and is thus accessible for a variety of purposes: including but not limited to: asset protection solutions, return validation, customer reference, and the like.

If at block 332 the user decides to provide payment for order 452 by transmitting payment via the mobile device 200 using mobile self-checkout application 400, then application 400 either debits a preregistered payment account of the user's or the user is prompted for payment account information. If the user has already created a preregistered payment account with mobile self-checkout application 400, by already entering payment account information which could include, credit card information, online payment service information such as a user account name and password, store credit information, or gift card information, then mobile self-checkout application 400 debits the preregistered account at block 334. If the user has not already created a preregistered payment account with mobile self-checkout application 400, the user is prompted to create a payment account by providing payment account information. Upon creating the payment account, the mobile self-checkout application 400 then debits the payment account for the total payment amount 464. Upon debiting either the preregistered payment account or the just created payment account, the method 300 then moves to block 336, whereupon the whereupon the virtual shopping cart 433 is then marked paid and a receipt is generated by the remote server 240, the traditional cashier, and/or the self-checkout station. The receipt is then provided to the user. Sales transaction and receipt information is stored on the remote server 240 and is thus accessible for a variety of purposes: including but not limited to: asset protection solutions, return validation, customer reference, and the like.

Moving to block 338, upon marking that the virtual shopping cart 433 is paid, mobile self-checkout application 400 is terminated and the user exits the retail establishment at block 340.

Figure 19:
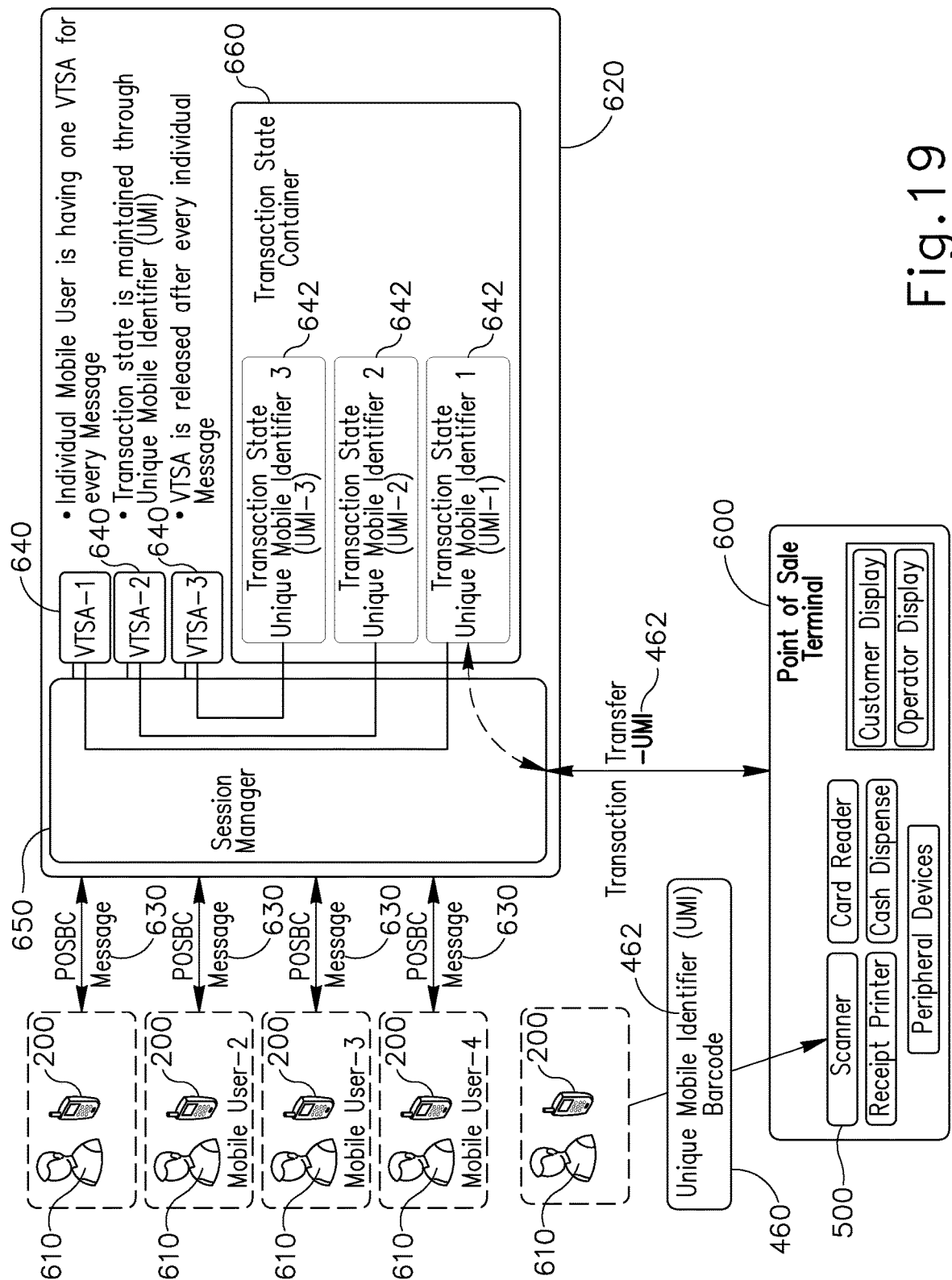
FIGS. 19, 20 and 21 depict various schematic representations of methods, apparatus (systems) and computer program products, in accordance with one embodiment of the present invention.
Figure 20:
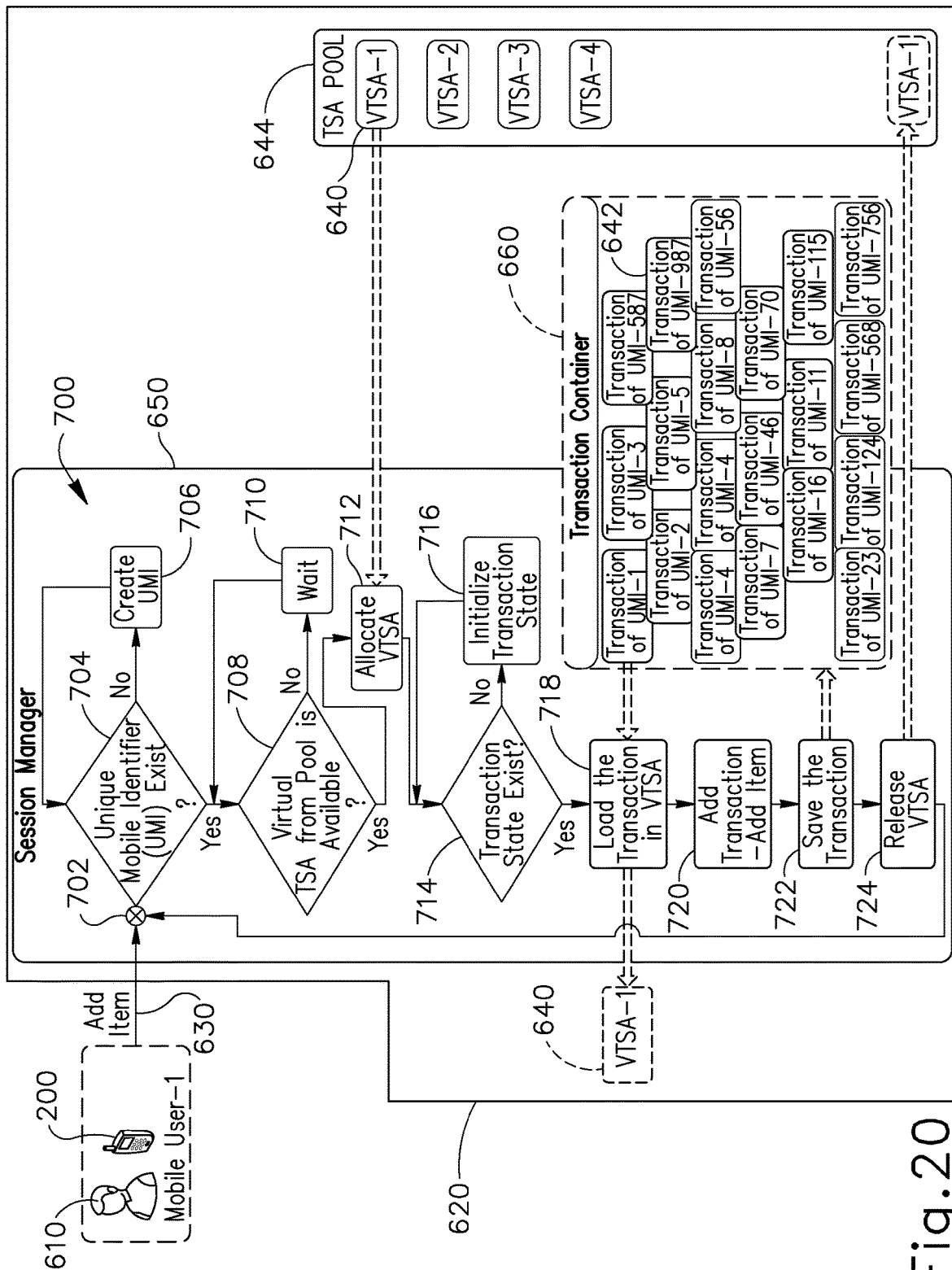
Figure 21:
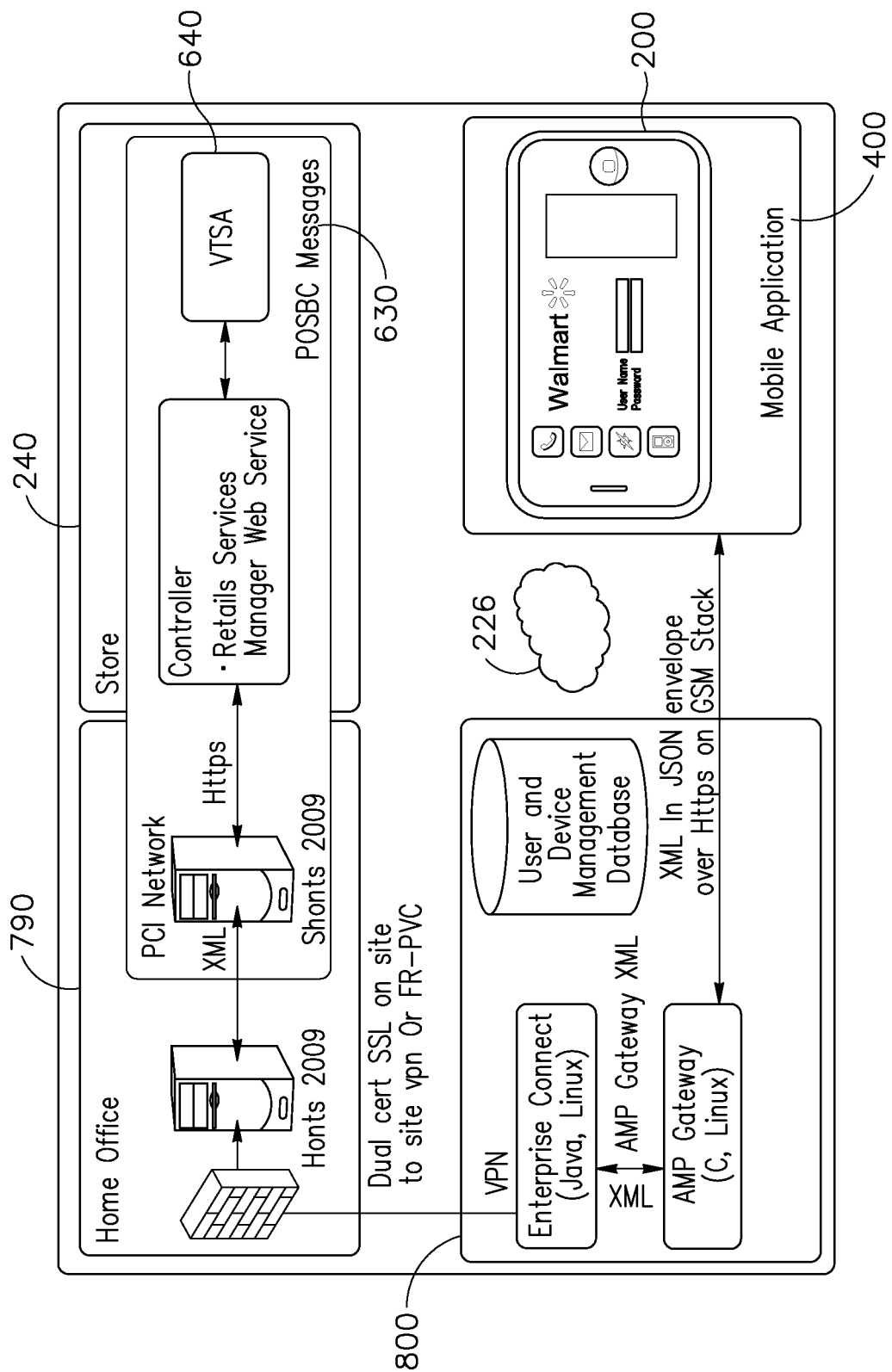

With reference to FIGS. 19, 20 and 21, a terminal sales application 620 for maintaining and conducting a virtual transaction is shown. Terminal sales application 620 includes a session manager 650 in communication with a Virtual Terminal Sales Application (VTSA) 640 and a transaction state container 660. A virtual transaction contains all of the information found within order 452 or virtual shopping cart 433, but is conducted entirely with an application, such as a VTSA 640 run within terminal sales application 620. Unlike real transactions which are processed on a point of sale terminal 600 having peripheral devices, a virtual transaction is processed with an application which mimics the functionality of a point of sale terminal 600 and is run on a computer which lacks the peripheral devices point of sale terminal 600. Terminal sales application 620 resides on a computer, such as remote server 240, and interacts with mobile self-checkout application 400.

With reference to FIG. 19, terminal sales application 620 communicates with mobile self-checkout application 400 by receiving requests via Point of Sale (POS) messages 630 from the mobile self-checkout application 400 and by transmitting POS message 630 back to the mobile self-checkout application 400. POS messages 630 are messages which contain point-of-sale purchase information, such as Point of Sale Business Component messages used by point of sale terminals such as IBM™ Self Checkout Systems. In particular, session manager 650 of terminal sales application 620 communicates with mobile self-checkout application 400 by sending and receiving POS messages 630. POS messages 630 received by terminal sales application 620 contain a request to process information required for order 452, such as identification information 222, quantity information indicating how many units of a particular item 220 in the virtual shopping cart 433 a user 610 would like to purchase, user identification information, additional user information, an order number 463, store identifying information 410 which provides information that identifies the specific retail establishment in which the user is in, and a unique identifier 462 which identifies a specific virtual transaction, such as an order number 463 or a unique mobile identifier (UMI).

Each virtual transaction created or processed by terminal sales application 620 has a unique identifier 462 associated with it which identifies a specific order 452. The unique identifier 462 may be an order number 463 or a piece of identifying information which identifies a specific user 610 or a specific mobile device, such as a unique mobile identifier (UMI) or a user name or ID number. In one embodiment, the unique identifier 462 is a unique mobile identifier (UMI). By associating a unique identifier 462 with a specific virtual transaction, virtual transactions can be identified for each user 610 or mobile device 200 interacting with terminal sales application 620. Additionally, each POS message 630 received or transmitted by the terminal sales application 620 also includes a unique identifier associated with a virtual transaction. In this manner, each POS message 630 can be associated with and applied to the virtual transaction it was intended for.

Session manager 650 transmits and receives POS messages 630 to and from the mobile self-checkout application 400, and communicates the POS messages 630 to the VTSA 640. Additionally, session manager 650 interacts with a transaction state container 660 and communicates transaction state information 642 between the transaction state container 660 and the VTSA 640. Preferably, session manager 650 receives and prioritizes POS messages 630 received from mobile self-checkout application 400 in a queue and determines when a POS messages 630 is communicated to a given VTSA 640 and which VTSA 640 to communicate a given POS messages 630 to. Each time a POS message 630 is received from the mobile self-checkout application 400, the POS message 630 is routed by session manager 650 to an open session of an available VTSA 640 within terminal session manager 620. The unique identifier 462 embedded within POS message 630 is used by session manager 650 to locate transaction state information 642 associated with that unique identifier 462 used to conduct the virtual transaction for user 610. The transaction state information 642 is then sent by the session manager 650 to the VTSA 640 to which the POS message 630 having the same unique identifier 462 was routed, and then the session manager 650 instructs the VTSA 640 to start or further modify the virtual transaction for user 610. Preferably, session manager 650 can access an open session of a VTSA 640 from any one of a plurality of VTSAs 640 running within terminal sales application 620.

VTSA 640 is an application which represents a virtual point of sale terminal and is run on a computer, such as remote server 240. VTSA 640 mirrors the functions of a traditional terminal sales application run on a point of sale terminal 600 without requiring the associated peripheral devices of a traditional point of sale terminal 600, such as a scanner or a bar code scanner, a receipt printer, a credit card reader, a cash dispenser, a customer display, an operator display, and other peripheral devices. Preferably, terminal sales application 620 includes a plurality of VTSAs 640, each of which is running a session. By operating a plurality of VTSAs 640 all within a single terminal sales application 620, substantial cost and money may be saved by not having to purchase multiple dedicated hardware devices, such as traditional point of sale terminals 600, each running only a single instance of a terminal sales application.

Each VTSA 640 maintains a virtual transaction by generating and maintaining transaction state information 642 associated with each virtual transaction using a unique identifier 462. Since none of the peripheral devices associated with a traditional point of sale terminal 600 are required, multiple VTSAs 640 can run simultaneously on a general-purpose computer, such as remote server 240, in a virtual environment which simulates a traditional point of sale terminal 600 at less cost. Since multiple point of sale terminals 600 can be replaced in-part by a single computer, such as remote server 240, running multiple instances of VTSA 640, such as VTSA-1 640, VTSA-2 640, VTSA-3 640, as shown in FIG. 19, significant cost savings can be incurred by using VTSAs 640 in addition to added flexibility with how the virtual transaction can be crated and maintained.

Every time a virtual transaction is created or modified in any way, for example when the user 610 creates a virtual shopping cart 433 in mobile-self checkout application 400 or adds items 220 to the virtual shopping cart 433, a POS message 630 is transmitted from mobile-self checkout application 400 to session manager 650. POS messages 430 received by session manager 650 are then put in a queue with an associated priority. Typically. POS messages 430 are prioritized in the order they were received. As a session of a VTSA 640 becomes available or open, the session manager 650 can access the open session and load transaction state information 642 along with a particular POS message 430 into the open session of VTSA 640. The VTSA 640, upon receiving the transaction state information 642 and the POS message 630, acts upon the contents of the POS message 630 and updates the transaction state information 642 associated with that particular POS message 430. For example, if a particular POS message 430 includes information that an additional item 220 has been added to a user 610's virtual shopping cart 433, then the transaction state information 642 associated with that particular POS message 430 is updated to reflect this new information.

Every time a POS message 430 is received by an open session of VTSA 640, transaction state information 642 associated with the POS message 430 is retrieved from the transaction state container 660 and transmitted to the same open session of VTSA 640. Transaction state information 642 defines the current state of a virtual transaction, and includes information such as a listing of every item 220 in virtual shopping cart 433 or specific virtual transaction, item information 432 for each item 220 in virtual shopping cart 433 or specific virtual transaction, quantity information indicating how many units of a particular item 220 in the virtual shopping cart 433 or specific virtual transaction a user 610 would like to purchase, user identification information, additional user information, an order number 463, store identifying information 410 which provides information that identifies the specific retail establishment in which the user is in, and a unique identifier 462 which identifies a specific user, such as a unique mobile identifier (UMI), amount totals for all the items 220 in virtual shopping cart 433 or specific virtual transaction, tax information for items 220 in virtual shopping cart 433 or specific virtual transaction, a receipt, a receipt identifier, and any other information or data that VTSA 640 may require to process a virtual transaction.

Transaction state information 642 associated with a unique identifier 462 changes each time a POS message 430 having that same unique identifier 462 is received by a user 610 or transmitted to a user 610 by session manager 650 using VTSA 640. Once a virtual transaction has been processed by the VTSA 640, any change in the transaction state information 642 is saved by VTSA 640 in the transaction state container 660 and the transaction state information 642 is exported from the VTSA 640. New transaction state information 642 for another virtual transaction is then imported into and opened by VTSA 640. By constantly importing and exporting transaction state information 642 upon processing each received POS message 630, a terminal sales application 620 can using multiple VTSAs 640 to maintain virtual transactions for a large number of users 610. For example, ten VTSAs 640, can manage and process as many as hundreds of virtual transactions, each with their own unique transaction state information 642, since not all of the virtual transactions need be active at any given time.

By importing, changing, and then exporting the transaction state information 642 each time a POS message 630 is received from a mobile device 200, instead of just keeping transaction state information 642 constantly open, the VTSA 640 allows the server 240 to support more users 610 and ultimately more orders 452. The process of being able to import and export the transaction state for each VTSA 640 by sending and receiving a unique identifier 462 is also known as transaction transfer, as opposed to a suspend/retrieve transaction which reprocesses every item in a virtual shopping cart. Transaction transfer allows for a real time import and export of the transaction state for each VTSA 640.

If the session manager 650 did not use transaction transfer, users 610 would be limited to the number of sessions of VTSA 640 running on the server 240 since each mobile user 610 would be statically connected to an instance of a VTSA 640 until the order 452 was complete. If, for example, ten sessions were running on the remote server 240, then remote server 240 would only be able to handle the virtual transactions of only ten mobile users 610 at one time.

Using transaction transfer allows the session manager 650 to import the transaction state information 642, if it exists for a specific virtual transaction, to an open session of a VTSA 640, process the current request within POS message 630 (such as adding another item 220 to a user 610's virtual shopping cart 433), save and export the transaction state information in a storage device or drive 130 by associated the virtual transaction or order 452 with a unique identifier 462, and then free that session of VTSA 640 up for the next mobile user 610. This allows the remote server 240 to support many users 610 having many virtual transactions using only a limited number of, such as ten, sessions of VTSA 640 running on the server 240. Response time is the only variant, as opposed to being blocked until another user 610 is finished shopping.

Upon updating the transaction state information 642 associated with a particular POS message 430, a new POS message 630 is generated by the VTSA 640 and sent to the session manager 430. Depending on transaction state information 642, the POS message 630 is either routed back to the mobile device 200 and the mobile-self checkout application 400 or to a point of sale terminal 600. For example, if a user 610 has completed shopping and decided to transmit payment via the mobile device 200, or if the user is still shopping and adding items to the virtual shopping cart 433, then POS message 630 is routed back to the mobile device 200. However, if the user 610 has completed shopping and decided to transmit payment via a traditional cashier or self-checkout station, then POS message 630 is muted to point of sale terminal 600 whereupon the user 610 provides identifying information, such as a unique identifier 462 or optical machine-readable representation 460, to the point of sale terminal 600 and payment for order 452 is processed.

With reference to FIG. 21, transaction state information 642 can be maintained within remote server 240, transferred to another remote server 240 at another retail establishment, transferred to a home office server 790, or transferred to an enterprise server 800 and maintained at an enterprise level for access by multiple remote servers at multiple retail establishments across an enterprise. In one embodiment, POS messages 630 can be received by a terminal sales application 620 running in an enterprise server 800 at the enterprise level, from a multitude of sources, such as a mobile shelf-checkout application 400 running on a mobile device 200, a point of sale terminal 600, a user accessing a website on the Internet, or from a web-based application running on a browser. In this manner, a virtual transaction can be maintained and modified from a plurality of POS messages 630 arriving from a multitude of sources. As a result, a first POS message 630 related to a particular virtual transaction may be generated by a mobile shelf-checkout application 400 running on mobile device 200 and a second POS message 630 related to the same transaction may be generated by a user accessing a website. For example, a first item 220 can be added to a virtual shopping cart 433 (represented by a particular virtual transaction) via mobile self-checkout application 400, and a second item 220 can be added to the same virtual shopping cart 433 via a user accessing a website.

In one embodiment, a virtual transaction representing a gift registry having a first item 220 and a second item 220 is generated. A first user 610 may purchase and pay for the first item 220, using a first method of purchase, such as for example the mobile self-tr application 400, and a second user 610 can purchase and pay for the second item 220 using a second method of purchase, such as for example a website. Methods of purchase include mobile self-checkout application 400, a point of sale terminal 600, web-based applications, or information sent via a website.

In one embodiment, a first user 610 may purchase and pay for a first portion of a first item 220, using a first method of purchase, such as for example the mobile self-checkout application 400, and a second user 610 can purchase and pay for a second portion of first item 220 using the first method purchase or a second method of purchase, such as for example a website. A portion of an item 220 refers to a portion of the purchase price of the item 220. For example, if a purchase price of the first item 220 is $500, the first user 610 may pay for a $200 portion of the $500 purchase price and a second user may pay for a $300 portion of the purchase price, completing the transaction.

In one embodiment, if a user 610 decides to provide payment for order 452 using a point of sale terminal 600, a POS message 630 is transmitted to the terminal sales application 620 indicating the desire for the user to conduct a virtual transaction for order 452, where information for order 452 resides in the remote server 240 and an optical machine-readable representation 460 is generated by the terminal sales application 620 which is unique to each order 452. The optical machine-readable representation 460 is later transmitted to the mobile device 200 and displayed on the display 206.

In one embodiment, upon receiving the POS message 630, terminal sales application 620 generates a Virtual Terminal Sales Application (VTSA) 640 for each virtual transaction conducted by each user 610. Each VTSA 640 has its own unique identifier 462 generated for it, wherein each VTSA 640 and each unique identifier 462 associated with it represent a unique order 452. Transaction state information 642 is maintained for each VTSA 640 using the unique identifier 462. Upon generating a unique identifier 462 for an order 452, the unique identifier 462 is then transmitted to mobile device 200 via application 400 in the form of optical machine-readable representation 460, and also transmitted to the point of sale terminal 600, where the unique identifier 462 is used to identify order 452 and a user 610 associated with unique order 452.

The self-checkout station, in addition the cashier's point-of-sale terminal, also uses transaction transfer to import the transaction state using optical machine-readable representation 460 encoding a unique identifier 462 from the remote server 240. The optical machine-readable representation 460 scanned from the mobile device 200 with scanning machine 500 encodes the unique identifier 462 which is then used by the point of sale terminal 600 to find the associated order 452 that resides on the remote server 240.

With reference to FIG. 20, a POS message 630 is generated as a result of input from a user 610 and received by terminal sales application 620, and specifically session manager 650, and a method 700 for maintaining and conducting a virtual transaction is initiated at block 702. Method 700 is performed by terminal sales application 620 which resides on the server 240. Upon initiating method 700 at block 702, the method 700 awaits to receive a POS message 630. Upon receiving a POS message 630, method 700 then moves to block 704, whereupon it is determined if a unique identifier 462 or a unique mobile identifier (UMI) exists or not for a particular virtual transaction being referred to by user 610 within received POS message 630. If a unique identifier 462 or a unique mobile identifier (UMI) does not exist, then one is created by session manager 650 or retrieved from mobile device 200 by session manager 650 at block 706. The unique identifier 462 or unique mobile identifier (UMI) is then associated with the virtual transaction and method 700 moves from block 706 back to block 704. If a unique identifier 462 or a unique mobile identifier (UMI) does exist, then method 700 moves to block 708, whereupon it is determined if a Virtual Terminal Sales Application (VTSA) 640 is available for use. In one embodiment, a plurality of VTSAs 640 are operating within the terminal sales application 620, the plurality of VTSAs 640 referred to herein as a TSA Pool 644. In this embodiment, at block 708, it is determined if a VTSA 640 from TSA Pool 644 is available. If no VTSA 640 is available, then method 700 moves to block 710 and waits.

If a VTSA 640 is available, then method 700 moves to block 712 and allocates a VTSA 640 for conducting a virtual transaction in relation to the received POS message 630 and associated with the unique identifier 462 or UMI. When the VTSA 640 is allocated, a new session of the VTSA 640 is opened. Upon allocating a VTSA 640, method 700 then moves to block 714, whereupon it is determined if transaction state information 642 exists for the virtual transaction or not. If transaction state information 642 does not exist for the virtual transaction, then transaction state information 642 is initialized and generated at block 716 and then the method 700 moves back to block 714.

If transaction state information 642 does exist for the virtual transaction, then the method 700 moves to block 718, whereupon the transaction state information 642 is retrieved and loaded into the VTSA 640. If transaction state information 642 already existed and resides in transaction container 660, then the transaction state information 642 is retrieved from the transaction container 660 and loaded into the VTSA 640 at block 718.

Upon loading the transaction state information 642 into the VTSA 640, the method 700 then moves to block 720, whereupon a transaction item, received within POS message

630, is added to or processed within the virtual transaction by the VTSA 640. A transaction item is any portion of a virtual transaction, and includes such things as adding or removing an item 220 from virtual shopping cart 433, totaling items 220 within virtual shopping cart 433, a payment for all items 220, some items 220, one item 220, or a portion of one item 220 within virtual shopping cart 433 or a specific virtual transaction, indicating a payment method for an item 220 within virtual shopping cart 433 or a specific virtual transaction, or any other activity or bit of information associated with the virtual transaction.

Upon processing or adding the transaction item using VTSA 640, method 700 moves to block 722, whereupon the transaction state information 642 is saved by VTSA 640 within the transaction container 660. Transaction container 660 represents a location within a storage device for storing transaction state information 642. Upon saving the transaction state information 642, method 700 moves to block 724 and releases the VTSA 640 back into the TSA Pool 644, and closing the open VTSA 640 session, making VTSA 640 available for use by session manager 650 to process another request within a received POS message 630. Method 700 then moves back to block 702 and awaits the receipt of another POS message 630.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.). (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

We claim:

1. A method of providing a mobile point-of-sale through a mobile device, the method comprising:
    executing a mobile self-checkout application on the mobile device, the mobile self-checkout application allowing a user of the mobile device to select items in a store and tender payment for the selected items via a user interface rendered by the mobile self-checkout application on a display of the mobile device;
    initiating a session between the mobile device and a server, the session managed by a session manager and storing state information in a state container, the state information comprising user identification data, store identification data, transaction identification data, and a state of a transaction corresponding to the session;
    rendering the user interface on the display of the mobile device by the mobile self-checkout application;
    in response to a selection via the user interface, obtaining identification information associated with each of a plurality of physical objects, wherein the obtaining the identification information comprises activating an imaging device of the mobile device to capture the identification information associated with the plurality of physical objects or displaying a manual identification information box to receive the identification information associated with one or more of the plurality of physical objects manually entered by the user through the manual identification information box;
    obtaining by the mobile device based on the identification information, item information associated with each of the plurality of physical objects;
    generating a virtual shopping cart to save the item information associated with the plurality of physical objects;
    adding the item information of the plurality of physical objects to the virtual shopping cart, wherein the server is configured to update the state information to include the item information of the plurality of physical objects in the virtual shopping cart;
    rendering, by the mobile device on the display and while the user is in the process of selecting the plurality of physical objects, a current number of the plurality of physical objects having been added to the virtual shopping cart;
    receiving an instruction via the user interface of the mobile self-checkout application to complete a transaction of a sale of the plurality of physical objects identified in the virtual shopping cart;
    rendering, by the mobile device on the display, a machine readable element, the machine readable element to be scanned at an optical scanning device within the store and prior to the completion of the transaction, wherein the machine readable element is used by the optical scanning device to look up the transaction including the virtual shopping cart to confirm payment and complete the transaction, the transaction including the plurality of physical objects identified in the virtual shopping cart; and
    rendering, by the mobile device on the display, an electronic receipt.

2. The method of claim 1, further comprising:
    completing, by the server, the transaction of the sale of the plurality of physical objections based on payment information; and
    receiving, from the server, receipt information at the mobile device in response to the completion of the sale of the plurality of physical objects.

3. The method of claim 1, further comprising:
    optically scanning, by the optical scanning device in communication with a point-of-sale system, the machine readable element rendered on the display of the mobile device;
    obtaining, based on the scanning of the machine readable element, transaction information corresponding to the virtual shopping cart;
    retrieving, by the point-of-sale system using the transaction information, a total payment amount due to complete the sale of the plurality of physical objects; and
    receiving, through the point-of-sale system, tendered payment of the total payment amount of the transaction.

4. The method of claim 1, further comprising:
    generating, by the mobile self-checkout application, the machine readable element.

5. The method of claim 1, further comprising:
    receiving, through the mobile self-checkout application executed on the mobile device, a selection of a first method of payment from a set of registered payment methods to be used in obtaining at least part of the payment.

6. The method of claim 1, wherein the obtaining the item information associated with the plurality of physical objects comprising retrieving, by the mobile device, the item information stored in memory using the identification information, and the mobile device generating the virtual shopping cart.

7. The method of claim 1, further comprising:
    receiving a selection, through the mobile self-checkout application, to modify the virtual shopping cart; and
    modifying, by the mobile self-checkout application executed on the mobile device, the virtual shopping cart in accordance with the selection.

8. The method of claim 1, further comprising:
    accessing, through the mobile device, item rating information corresponding to at least a first physical object of the plurality of physical objects; and
    displaying the item rating information on the display of the mobile device.

9. A system comprising:
    a mobile device executing a first application to allow a user of the mobile device to select items in a store and tender payment for the selected items via a user interface rendered by the first application on a display of the mobile device, the first application allowing a user of the mobile device to:

initiate a session between the mobile device and a server, the session managed by a session manager with state information being stored in a state container of the server, the state information comprising user identification data, store identification data, transaction identification data, and a state of a transaction corresponding to the session;

render the user interface on the display of the mobile device by a mobile self-checkout application;

obtain, in response to a selection via the user interface, identification information associated with each of a plurality of physical objects, wherein the obtaining the identification information comprises activate an imaging device of the mobile device to capture the identification information associated with the plurality of physical objects or display a manual identification information box and receive the identification information associated with one or more of the plurality of physical objects manually entered by the user through the manual identification information box;

obtain, based on the identification information, item information associated with each of the plurality of physical objects;

generate a virtual shopping cart and to save the item information associated with the plurality of physical objects;

add the item information of the plurality of physical objects to the virtual shopping cart, wherein the server is configured to update the state information to include the item information of the plurality of physical objects in the virtual shopping cart;

render, on the display and while the user is in the process of selecting the plurality of physical objects, a current number of the plurality of physical objects having been added to the virtual shopping cart;

receive an instruction via a selection of a checkout function of the user interface of the mobile self-checkout application to complete a transaction of a sale of the plurality of physical objects identified in the virtual shopping cart;

rendering, by the mobile device on the display, a machine readable element, the machine readable element to be scanned at an optical scanning device within the store and prior to the completion of the transaction, wherein the machine readable element is used by the optical scanning device to look up the transaction including the virtual shopping cart to confirm payment and complete the transaction, the transaction including the plurality of physical objects identified in the virtual shopping cart; and rendering, by the mobile device on the display, an electronic receipt.

10. The system of claim 9, wherein:
the server is further configured to:
complete the transaction of the sale of the plurality of physical objects based on payment information; and
transmit receipt information to the mobile device in response to the completion of the sale of the plurality of physical.

11. The system of claim 9, further comprising:
a point-of-sale system; and
an optical scanning device in communication with a point-of-sale system;

wherein the optical scanning device is configured to optically scan the machine readable element rendered on the display of the mobile device and obtain, based on the scanning of the machine readable element, transaction information corresponding to the virtual shopping cart;
the point-of-sale system is configured to receive using the transaction information a total payment amount due to complete the sale of the plurality of physical objections, and
receive tendered payment of the total payment amount of the transaction.

12. The system of claim 9, further comprising:
wherein the mobile self-checkout application executed on the mobile device is configured to generate the machine readable element.

13. The system of claim 9, wherein the mobile device, in obtaining the item information associated with the plurality of physical objects, is configured to retrieve the item information stored in memory using the identification information, and the mobile device generating the virtual shopping cart.

14. The system of claim 9, wherein the mobile device, in retrieving the item information, is configured to communicate the identification information to the server; and
the server is further configured to retrieve the item information from memory and communicate, over a distributed network, the item information to the mobile device.

15. The system of claim 9, wherein the mobile device, through the mobile self-checkout application, is further configured to:
receive a selection to modify the virtual shopping cart; and
modify the virtual shopping cart in accordance with the selection.

16. The system of claim 9, wherein the mobile device is further configured to access item rating information corresponding to at least a first physical object of the plurality of physical objects, and display the item rating information on the display of the mobile device.

17. The system of claim 9, wherein the mobile device, through the mobile self-checkout application, is configured to receive a selection by the user of a first method of payment to pay for a first portion of a total cost identified in the virtual shopping cart, and receive a selection by the user of a second method of payment to pay for second portion of the total cost identified in the virtual shopping cart; and
communicate to the server a notification of the first method of payment for the first portion of the total cost and the second method of payment for the second portion of the total cost.

18. The method of claim 1, further comprising:
activating relative to the transaction, in response to receiving the instructions to complete the transaction, a first virtual terminal sales application (VTSA) of a plurality of VTSAs on the server, causing the first VTSA to import the state information in completing the transaction of the sale of the plurality of physical objects and export by the VTSA changed state information to the state container based at least on the completion of the transaction, wherein the first VTSA is deactivated relative to the transaction following the exporting of the changed state information.

19. The method of claim 1, further comprising:
activating, in response to each selection of each of the plurality of physical objects, one of a plurality of virtual terminal sales applications (VTSA), causing the activated one of the plurality of VTSAs to import the state information corresponding to the transaction, and export to the state container by the activated one of the plurality of VTSAs changed state information corresponding to the selected physical object of the plurality of physical objects, wherein the activated one of the plurality of VTSAs is deactivated relative to the transaction following the exporting of the changed state information.

20. The method of claim 1, wherein rendering the machine readable element comprises rendering the machine readable element that encodes customer identifying information that when scanned is extracted and at least in part used to identify the transaction including the virtual shopping cart in completing the transaction.

21. The method of claim 1, wherein the rendering the current number of the plurality of physical objects having been added to the virtual shopping cart comprises rendering the current number of the plurality of physical objects having been added to the virtual shopping cart in cooperation with a view cart option configured to cause, in response to detecting a selection of the view cart option, a shopping cart interface to be displayed on the display, wherein the shopping cart interface comprising a listing of the current physical objects having been added to the virtual cart and a checkout option; and rendering, while rendering the view cart option and the current number of the plurality of physical objects having been added to the virtual shopping cart rendered in cooperation with the view cart option, a scan item interface presented in cooperation with activating a scanning module enabling the scanning of an identifying aspect of an additional physical object.

22. The method of claim 1, wherein the state information in the state container further comprises one or more of depending on a status of the transaction: a listing of the plurality of physical objects in the virtual shopping cart, the item information of the plurality of physical objects in the virtual shopping cart, a quantity of each of the plurality of physical objects in the virtual shopping cart, a unique identifier corresponding to the amount device, payment amount totals, tax information, the electronic receipt, and an electronic receipt identifier.

23. The method of claim 1, wherein the state container is associated with an identifier of the mobile device.

* * * * *

UNITED STATES PATENT AND TRADEMARK OFFICE
CERTIFICATE OF CORRECTION

PATENT NO. : 11,853,988 B2
APPLICATION NO. : 17/004819
DATED : December 26, 2023
INVENTOR(S) : David Martin Nelms et al.

Page 1 of 1

It is certified that error appears in the above-identified patent and that said Letters Patent is hereby corrected as shown below:

In the Claims

In Column 23, Claim 10, Line 62, delete "of physical." and insert -- of physical objects. --, therefor.

In Column 24, Claim 12, Line 13, delete "claim 9, further comprising:" and insert -- claim 9, --, therefor.

Signed and Sealed this
Twenty-eighth Day of May, 2024

Katherine Kelly Vidal
*Director of the United States Patent and Trademark Office*